US012496624B2

(12) United States Patent
Rutkowski et al.

(10) Patent No.: US 12,496,624 B2
(45) Date of Patent: Dec. 16, 2025

(54) TORQUE LIMITER FOR POWERED DRAIN CLEANER

(71) Applicant: Ridge Tool Company, Elyria, OH (US)

(72) Inventors: Michael J. Rutkowski, North Royalton, OH (US); Mitchell Barton, Richfield, OH (US); Alex Michael Cole, Columbia Station, OH (US); Donald M. Embree, Akron, OH (US); Nicholas Christopher Mavros, Columbia Station, OH (US); Jeffrey Szucs, Columbia Station, OH (US)

(73) Assignee: Ridge Tool Company, Elyria, OH (US)

( * ) Notice: Subject to any disclaimer, the term of this patent is extended or adjusted under 35 U.S.C. 154(b) by 1165 days.

(21) Appl. No.: 17/210,586

(22) Filed: Mar. 24, 2021

(65) Prior Publication Data

US 2021/0205863 A1 Jul. 8, 2021

Related U.S. Application Data

(63) Continuation-in-part of application No. 16/420,383, filed on May 23, 2019, now Pat. No. 10,987,708.

(60) Provisional application No. 63/106,391, filed on Oct. 28, 2020, provisional application No. 62/994,557, filed on Mar. 25, 2020, provisional application No. 62/797,744, filed on Jan. 28, 2019.

(51) Int. Cl.
*B08B 9/045* (2006.01)
*E03F 9/00* (2006.01)

(52) U.S. Cl.
CPC .............. *B08B 9/045* (2013.01); *E03F 9/005* (2013.01)

(58) Field of Classification Search
CPC .......... B08B 9/045; E03F 9/005; E03F 9/002; F16D 1/02; F16D 7/005; F16D 7/06; F16D 7/708; F16D 7/025; F16C 1/08; E03C 1/302; B65H 2701/39
See application file for complete search history.

(56) References Cited

U.S. PATENT DOCUMENTS

| | | | |
|---|---|---|---|
| 1,538,698 A | 5/1925 | Hall | |
| 2,983,121 A * | 5/1961 | Naas | F16D 7/08 464/36 |
| 3,317,943 A | 5/1967 | Primm | |
| 3,574,878 A * | 4/1971 | Shames | E03C 1/302 15/104.095 |
| 4,007,818 A * | 2/1977 | Orwin | F16D 43/206 192/56.57 |
| 4,218,802 A * | 8/1980 | Babb | E03F 9/005 15/104.33 |
| 7,367,077 B2 | 5/2008 | Rutkowski et al. | |
| 8,646,143 B2 | 2/2014 | Lokkinen et al. | |

(Continued)

FOREIGN PATENT DOCUMENTS

GB 2117078 10/1983

*Primary Examiner* — Laura C Guidotti
(74) *Attorney, Agent, or Firm* — Erik J. Overberger; RANKIN, HILL & CLARK LLP

(57) ABSTRACT

A torque limiter and a retrievable chain knocker tool, each separately configured for use with a drain cleaning apparatus are described. The drain cleaning apparatus includes a drum housing defining an interior region, a cable carrier rotatably mounted within the housing interior region, and a transmission assembly operatively configured for transferring rotary power to an end portion of flexible cable retained in the housing.

20 Claims, 27 Drawing Sheets

(56) References Cited

U.S. PATENT DOCUMENTS

| | | | |
|---|---|---|---|
| 10,801,552 B2* | 10/2020 | Walz | F16D 43/218 |
| 2017/0268216 A1 | 9/2017 | Cole et al. | |

* cited by examiner

TORQUE LIMITER FOR POWERED DRAIN CLEANER

CROSS REFERENCE TO RELATED APPLICATIONS

The present application is a continuation-in-part (CIP) of U.S. nonprovisional Ser. No. 16/420,383 filed May 23, 2019, which claims priority on U.S. provisional patent application Ser. No. 62/797,744 filed Jan. 28, 2019. The present application also claims priority on U.S. provisional application Ser. No. 62/994,557 filed Mar. 25, 2020, and on U.S. provisional application Ser. No. 63/106,391 filed Oct. 28, 2020.

The present patent application incorporates by reference U.S. nonprovisional patent application Ser. No. 16/420,383 filed May 23, 2019 in its entirety.

FIELD

The present subject matter relates to drain cleaning machines, systems, and equipment used in performing drain cleaning.

BACKGROUND

The maintenance and cleaning of plumbing lines typically involves systems with special end fittings, e.g., augers and cutter tools, fastened to end portions of drain cleaning cables. Several recent developments, found to be particularly effective in the field of drain cleaning, are products currently being marketed by Ridge Tool Company. Such drain cleaning products use novel high speed systems disclosed in U.S. application Ser. No. 16/420,383 and marketed under the federally-registered "FlexShaft" brand.

Such systems typically include a motor or drill connected to a flexible metal cable comprising plural intertwined wires of suitable length encased within a polymeric hose. The intertwined wires (or core) of such cable typically spin from between about 1500 RPM to about 3500 RPM, while the polymeric hose (or sheath) remains stationary, thereby providing minimal torque at a distal end portion of the cable, where a cleaning attachment is located. When used for drain cleaning purposes, such cable is inserted into a "cleanout" port or other service location in a drain and pushed into the drain until a blockage is encountered, at which point, the user applies power to the machine to spin the cleaning attachment, to clean out blocked pipes. Users of conventional systems are often required to slowly engage blockage, since conventional systems do not produce enough torque to rapidly tear through blockage. That is because conventional systems use relatively high rotational speeds for their cleaning attachments, in order to scrape the inside surface of pipelines and ultimately remove the blockage that is present there.

Although satisfactory in many respects, additional improvements to current drain cleaning systems would be appreciated by drain cleaning professionals desiring to provide their customers with the best professional services at the lowest possible cost. Numerous additional improvements to current drain cleaning systems may be found in various professional-grade drain cleaning systems, marketed by Ridge Tool Company under the federally-registered "FlexShaft" brand, used for cleaning out drains, sewers, pipelines, and other constructs, located underground or through walls. Such improved drain cleaning systems, including various drain cleaning systems that are commercially available from Ridge Tool Company, and drain cleaning systems disclosed throughout this application and thus covered by the appended claims, shall now be summarized.

SUMMARY

Numerous difficulties and drawbacks associated with previous approaches to cleaning out drains, sewers, and pipelines are addressed in this application as follows.

In one aspect, the present subject matter provides a torque limiter for use in a drain cleaning machine, apparatus, or system. Such a torque limiter comprises a first rotatable member for engagement to a source of rotational power. The torque limiter also comprises a second rotatable member for transfer of rotational power to a drain cleaning cable. The second member is positioned near the first member. The torque limiter also comprises at least one spherical member disposed between the first and second members. The first member defines a first face directed toward the second member, and the second member defines a second face directed toward the first member. The first member defines at least one capture region along the first face, wherein the at least one capture region is configured (e.g., dimensioned and shaped) to retain a spherical member. The second member defines at least one recessed portion or region along the second face. The at least one recessed region is sized and shaped to contact a spherical member positioned therein. The torque limiter also comprises a biasing assembly configured to apply a compressive force between the first and second members and thereby enable torque transfer between the first and second members, so that when excessive torque is applied to the first member, the at least one spherical member is caused to be displaced from contacting the receiving region of the second member, thereby limiting transfer of the excessive torque to the second member.

In yet another aspect, the present subject matter is directed, e.g., to a drain cleaning apparatus comprising a drum housing defining an interior region. The drain cleaning apparatus also comprises a cable carrier rotatably mounted within the interior region of the drum housing, wherein the cable carrier, when mounted within the interior region, is rotatable independently from the drum housing. The drain cleaning apparatus further comprises a torque limiter mounted on the cable carrier and, wherein the torque limiter includes a first member for engagement to a rotary power source and a second member for delivering rotary power. In relation to the drain cleaning devices, machines and systems disclosed herein, the second member typically delivers rotary power to a drain cleaning cable end portion located within the interior region of the cable carrier.

In still another aspect, the present subject matter accordingly discloses and provides a drain cleaning device, machine, apparatus, and system comprising a drum housing, wherein the drum housing is a structure that includes a front wall. The drain cleaning system further comprises a torque limiter which could be disposed within the drum housing. The torque limiter includes a rotatable first member that is engageable by a source of rotary power. The first member is accessible along the front wall of the drum housing and is preferably located at or along a central region of the front wall.

In another aspect, the present subject matter provides a retrievable chain knocker tool comprising a spindle defining a proximal end, and an opposite distal end, wherein the tool further defines an aperture extending through the spindle. The chain knocker tool includes a retaining lug defining a receiving region adapted to receive an end portion of a cable that provides rotary power, and wherein the receiving region is further adapted to receive, or be removably affixed to, at least a portion of the spindle. The retaining lug, which comprises a threaded engagement region, includes a pair of aligned apertures, wherein the threaded engagement region is located along an outer periphery of the retaining lug. The chain knocker tool further comprises a lug retaining cap defining a central aperture shaped and dimensioned to receive the spindle, wherein the lug retaining cap also defines a pair of aligned apertures, wherein the lug retaining cap further defines a threaded engagement region located along an inner surface of the lug retaining cap. The spindle is at least partially disposed in the retaining lug such that the aperture defined by the spindle is aligned with the pair of aligned apertures defined in the retaining lug. Also, the retaining lug is threadedly engaged with the lug retaining cap by threaded engagement of their respective threaded and intermeshed engagement regions such that the aligned apertures defined in the lug retaining cap are aligned with the aligned apertures defined in the retaining lug as well as the aperture defined in the spindle. The chain knocker tool also comprises a shear pin disposed in and extending through the aligned apertures defined in the lug retaining cap. Moreover, the shear pin is disposable in and extendable through the aligned apertures (noted above) defined in the retaining lug, and through the aperture (also noted above) defined in the spindle.

In yet another aspect, the present subject matter provides a retrievable chain knocker tool comprising: a spindle defining a proximal end and an opposite distal end. The chain knocker tool comprises a proximal retaining lug defining a receiving region adapted to receive an end portion of a cable providing rotary power. The chain knocker tool additionally comprises a distal retaining lug adapted to receive at least a portion of the spindle. The chain knocker tool further comprises an adjusting spring retaining nut. The chain knocker tool includes a retaining cap. The adjusting spring retaining nut and the retaining cap define a hollow interior region and are disposed between the proximal retaining lug and the distal retaining lug. The chain knocker tool comprises a torque transmitting assembly including a proximal ratchet member, a distal ratchet member, and a spring, wherein the torque transmitting assembly is disposed in the interior region.

In still another aspect, the present subject matter also discloses and provides a drain cleaning device, machine, apparatus, and system comprising a drum housing defining an interior region, and a cable carrier mounted within the interior region of the drum housing. The cable carrier, mounted within the interior region, is independently rotatable from the drum housing. The drain cleaning device, machine, apparatus, and system further comprises a clutch assembly mounted on the cable carrier, wherein the clutch assembly includes a primary clutch member for engagement to a rotary power source and a secondary clutch member for delivering rotary power to a drain cleaning cable end located within the interior region of the drum housing.

As will be realized, the subject matter described herein is capable of other and different embodiments. Therefore, the following details are capable of modifications in various respects, all without departing from the claimed subject matter. Thus, the associated drawings and description which follows are illustrative and not restrictive.

DETAILED DESCRIPTION OF THE EMBODIMENTS

The present subject matter is generally directed to drain cleaning devices, machines, apparatuses, and/or systems comprising a drum housing that is used in association with known flexible drain cleaning cables. The drum housing includes a cable drum or cable carrier which is rotatably mounted within the interior of the drum housing. In operation, the drum housing serves to store and/or retain the flexible cable and may also promote a user dispensing and/or retracting the cable relative to the drum housing or the cable carrier. The drain cleaning machines, apparatuses and/or systems also comprise a transmission assembly, typically used for transferring rotary power from a power source to the flexible cable. And, during preferred operation, the transmission assembly is thusly used to transfer rotary power to an end portion of the flexible cable.

Figure 1:
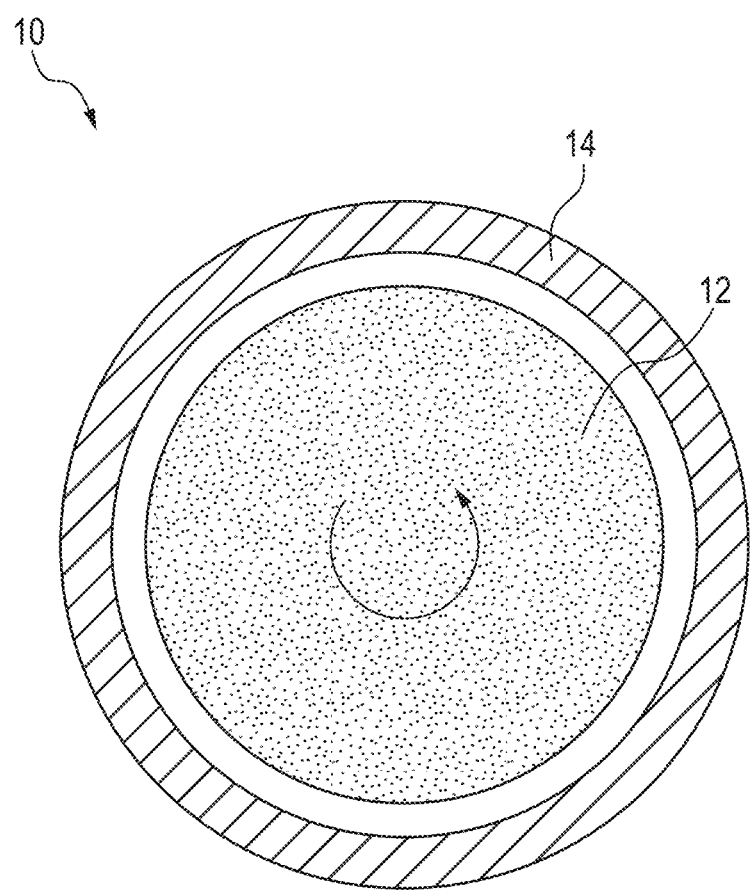
FIG. 1 is an exemplary and illustrative, schematic cross-sectional view of a typical flexible cable disclosed and described in relation to the present subject matter.

The flexible drain cleaning cable or shaft, hereinafter generally referred to as federally-registered "FlexShaft" (brand) cable and/or federally-registered "Flex Shaft" (brand) cable, includes a rotatable flexible cable or shaft that moves independently of a sheath that surrounds the cable. FIG. 1 schematically depicts a typical flexible cable 10 of the present subject matter. In this regard, FIG. 1 presents a cross section of a rotatable internal core 12 or shaft within the interior of a non-rotating sheath 14. Since the outer sheath 14 does not rotate with inner core 12, the surface of outer sheath 14 provides a convenient contact region for a user to control and manipulate the cable 10.

The devices of the present subject matter also reduce wear on the internal faces of the drum housing, since sheath 14 serves as a wear barrier between the drum housing and the rotating core 12 or shaft. The term "internal faces of the drum" refers to surfaces of the drum housing that contact or potentially contact exterior surface portions of flexible drain cleaning cable 10 or shaft. Because the rotating core 12 doesn't directly contact the interior of the drum housing, it is expected, or course, that such non-contact would promote longer drum life. Additionally, since the exterior surface of the sheath 14 is smooth, it is quite easy to wipe contaminates and drain waste from the sheath's outer surface, which promotes a cleaner operational process for users. Additional benefits in improved cleanliness result from sheath 14 covering the rotating core 12. Conventional exposed woundwire coils retain water and debris which will spin off upon cable rotation.

The device, machine, apparatus and/or system of the present subject matter also comprises a transmission assembly to which a rotary power source such as a drill is engaged. The transmission assembly of the present subject matter is capable of effectively transmitting rotary motion from a power drill or alternative rotary power source directly to an input of the transmission assembly, which may be a flexible shaft or component of the transmission assembly, described in greater detail hereinbelow. The transmission assembly may also include provisions for selectively transferring power from a power drill or other power source to flexible cable. One example of such provisions is a power control switch. Providing such readily accessible power control switches of the device, machine, apparatus, and/or system of the present subject matter to users, gives a user greater control, and more precise control, of the cleaning process.

The cable carrier is configured to rotate within the stationary drum housing, in such a way that the cable carrier is not in direct contact with the user. This helps reduce the occurrence of pinch points particularly whenever the system is used or transported.

In addition, the drain cleaning devices of the present subject matter provide an improved ergonomic interface between the user and the drain cleaning machine, or system. Such an improved ergonomic interface provides additional utility to a pipeline, drain, or sewer cleaning user. These aspects are described in greater detail herein.

The present subject matter thus also provides improved methods for drain, pipeline and sewer cleaning. The devices and systems of the present subject matter provide an alternative method to drain, pipeline and sewer cleaning professionals and to a lay person. The alternative methods disclosed herein may be desirable over traditional methods that use known devices including drum machines, sectional machines, jetters, hand-powered devices, or drill-powered devices for cleaning out drains, pipe, or sewers.

In comparison to conventional drain, pipeline, and sewer cleaning machines, the present subject matter enables effective cleaning though the use of high RPM, low torque applications. The term "high RPM" as used herein refers to a rotational speed of the flexible cable within a range of from about 1,000 RPM to about 4,000 RPM. Yet, it will be understood that the present subject matter, not limited to such operational RPMs, includes rotational speeds less than about 1,000 RPM and/or greater than 4,000 RPM.

The end effectors or cleaning tools typically utilized with sheathed and flexible cable applications are designed to abrade or "mill" away debris typically found within the drain, pipeline, and/or sewer cleaning environment, as opposed to traditional tools used in similar applications, that employ slower rotational speeds and higher torque in which such tools are designed to "bite down" into blockage to be displaced. The flexible cable system of the present subject matter uses fittings and/or cleaning tools made to conform to the inside of a pipe being cleaned. The benefit with such fittings is: they are capable of cleaning within a range of pipe diameters. This is advantageous for applications in which users must go through smaller pipe cleanouts to gain access to blockage in larger pipe. Such fittings are also effective when multiple pipe diameters are to be cleaned.

A feature of the devices, machines, and systems of the present subject matter is the ability to be powered by a battery-powered drill, thereby enabling greater flexibility and versatility to users of such drain cleaning equipment including devices, machines, and systems. In many embodiments, an input shaft or component of the transmission assembly is located in a central region of the drum housing. During desired operation, whenever lengths of flexible cable are extended (or retracted), such as when lengths of flexible cable are pulled by a user from an internal region of the drum housing, a drill or other rotary powered source connected to the transmission input, while stationary in relation to the transmission, is permitted to be moved by the user, wherein such relative movement advantageously enables localized or selective cleaning by the user of only preselected interior sections or regions of the pipeline. However, in sharp contrast to such "mobility," current jetter systems often clean the entire length of the pipe interior.

Further aspects, features, details and benefits of the illustrated drain cleaning devices, apparatuses, and systems of the present subject matter are as follows.

Drum Housing

The drum housing of the present subject matter provides an interior region within which the flexible cable is stored or retained during inoperability or "shut down." The drum housing, typically cylindrically shaped, could be partially cylindrical in shape. Thus, the present subject matter, not limited to cylindrical or similar shapes, includes a wide array of other shapes and configurations for a drum housing of the present subject matter. However, in particular versions of the present subject matter, the drum housing is configured to typically lay horizontally when in use, and to typically stand vertically when in storage. In this regard, the term "horizontal" refers to the plane of a front face of the drum housing, wherein the plane is oriented horizontal or parallel to a support surface or floor of floor or support surface. The term "vertical" refers to a plane of the front face of the drum housing, oriented perpendicular to a support surface or floor.

Figure 2A:
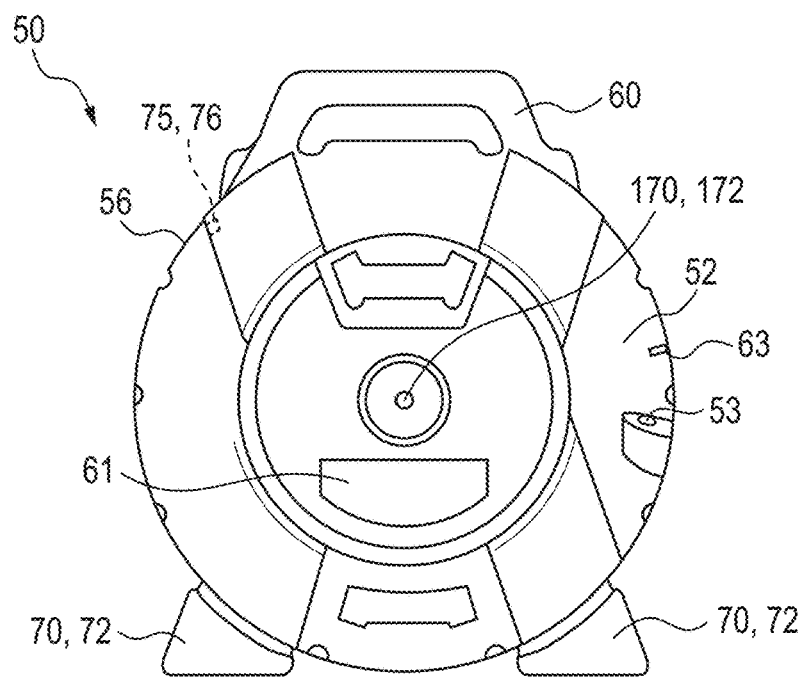
FIG. 2A is front view of an embodiment depicting an exterior of a typical drum housing of a drain cleaning apparatus in relation to the present subject matter.
Figure 2B:
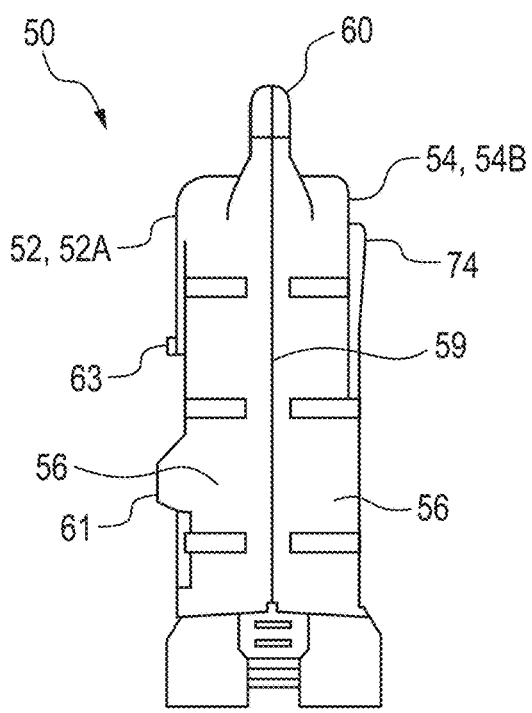
FIG. 2B is a side view of the typical drum housing depicted in FIG. 2A.

The drum housing can be manufactured or formed from a variety of injection molded polymeric materials. In addition, suitable drum housings can be provided in a clamshell configuration. In such a configuration, the drum housing comprises front and back components, which may or may not be identical. FIGS. 2A and 2B illustrate an embodiment of a drum housing 50 in accordance with the present subject matter. The illustrated drum housing 50 includes a front wall 52, an oppositely directed rear wall 54, and a generally circumferential side wall 56 extending between the front wall 52 and the rear wall 54. In the particular version shown in the referenced figures, the drum housing 50 is formed from a front component 52A and a rear component 54B which contact and engage each other along an interface 59 which generally bisects the drum housing 50. The drum housing 50 also defines a cable port 53 through which a desired or otherwise predetermined length of the flexible cable 10 (FIG. 1) may extend. The cable port 53 advantageously provides access into the interior region of drum housing 50. The cable port 53 could include a protective insert which can serve to protect against wear on the drum housing 50 as flexible cable 10 is repeatedly advanced and retracted in relation to the drum housing 50. Suitable protective inserts are generally manufactured or formed from materials exhibiting relatively low coefficients of friction. For certain embodiments, such materials exhibit coefficients of friction that are less than coefficients of friction of the material of the drum housing. For instance, in particular versions, an inner span or opening, such as the inner diameter, of the protective insert is slightly larger than the outer diameter of the outer sheath 14 of the flexible cable 10, thereby resulting in the protective insert also providing a wiping function to rid excess liquid or debris on the outer surface of the flexible cable as the flexible cable is retracted into drum housing 50. The drum housing 50 optionally includes a transport handle 60 typically extending from the side wall 56. The drum housing 50 may also include a secondary transport handle 61 (FIG. 2B) along an outer face such as on the front wall 52. The drum housing 50 may additionally include a cable retention clip 63 (FIG. 2A) provided near the cable port 53. The cable retention clip 63 serves to releasably engage a portion such as a distal end or other region of the flexible cable 10. Retaining or holding the flexible cable 10 along the drum housing 50 promotes ease in transporting and storing the drum housing 50 when it contains cable 10. Otherwise, the inner cable carrier can rotate independently from drum housing 50 whenever cable is withdrawn from or retracted into drum housing 50.

Figure 3:
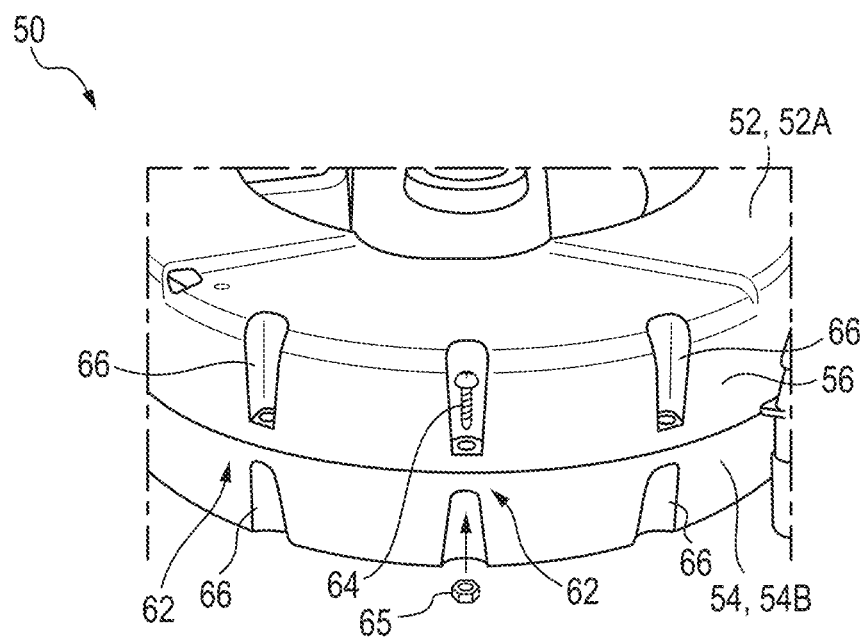
FIG. 3 is a partially-fragmented, perspective view of a portion of an exterior region of the typical drum housing, illustrating optional fasteners for the drum housing.

Drum housing sections, namely, the front and rear components 52A and 54B, are typically fastened together via threaded fasteners located around the circumference of drum housing 50. FIG. 3 depicts an embodiment of such a fastening configuration, comprising a bolted joint assembly 62. Specifically, bolted joint assembly 62 includes a threaded fastener 64 extending between apertured mating wall regions of front and rear components 52A and 54B. Fastener 64 can engage internal threads formed in the wall regions or engage a corresponding threaded nut 65 or another suitable fastener. Front and rear components 52A, 54B could define recessed regions 66 for receiving a bolted joint assembly 62. The present subject matter could, of course, also include alternative techniques and assemblies for joining the housing components together. For instance, nonlimiting examples of such assemblies include toggle clamps, over-center clamps, slide locks, and similar mechanisms. In addition, alternative fastener configurations, assemblies and tool-less access methods and components could potentially be utilized.

Figure 4:
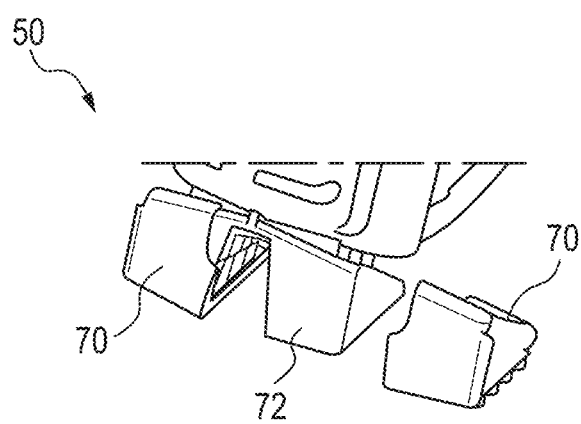
FIG. 4 is a partially-fragmented, detailed perspective view depicting optional feet components that can be used in connection with the typical drum housing depicted.

Rubberized feet, made from slip-resistant polymeric material, can optionally be provided on housing 50. Referring, e.g., to FIG. 4, feet 70 can be formed or made to cover protrusions or projections 72 located on drum housing 50. Such feet 70 and/or protrusions 72 serve to stabilize drum housing 50. A spatial "fit" between feet 70 and housing protrusions 72 could provide sufficient frictional engagement to remain on the housing without the use of fasteners. FIG. 4 shows rubberized feet 70 mated to the protrusions 72 located on housing 50, fastened via an interference "fit." Typically, such feet 70 are located along a region of drum housing 50 and, in particular, side wall 56, opposite from the handle 60 as depicted in FIG. 2A. Moreover, the present subject matter includes a wide array of varying locations for the feet 70 and/or the handle 60.

The drum housing 50 may also include a removable drain plug 75 as shown in FIG. 2A, which allows users to drain the system of any contaminates found in drum housing 50 or the system. The plug 75 can include a rubber insert, screw, plug, or cap which may or may not be tethered to the housing 50 to prevent loss. Once removed, the drum housing 50 is oriented such that liquids or other debris are urged toward an aperture 76 or hole formed or defined in housing 50, which the plug, screw, insert, or cap covers during use. In many versions, the aperture 76 and associated drain plug 75 are located along a region of the front wall 52 and near handle 60, as shown in FIG. 2A. Such a location results in aperture 76 being positioned away from liquid or debris within the interior of the drum housing 50 during use and storage orientations, such as vertical and horizontal for drum housing 50. In particular, drum housing 50 is generally oriented horizontally and with front wall 52 directed downwards for drainage. A relatively high location of aperture 76 and drain plug 75 advantageously ensures against inadvertent escape or leakage of liquid or debris from drum housing 50 during use and/or storage.

Figure 5A:
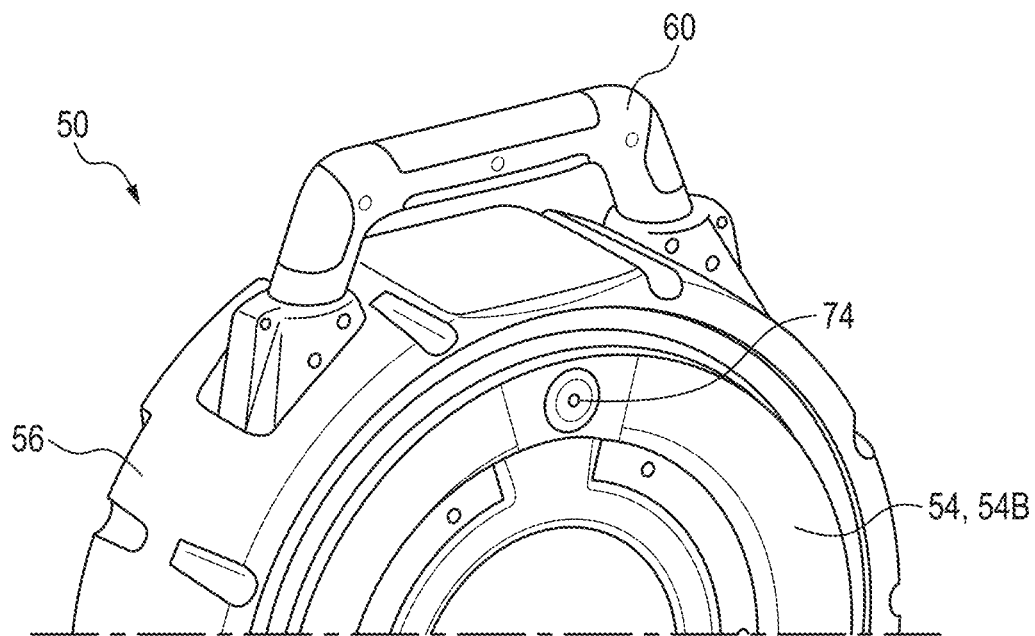
FIG. 5A is a partially-fragmented, perspective view, depicting certain details of an upper portion or region of the typical drum housing of the present subject matter.
Figure 5B:
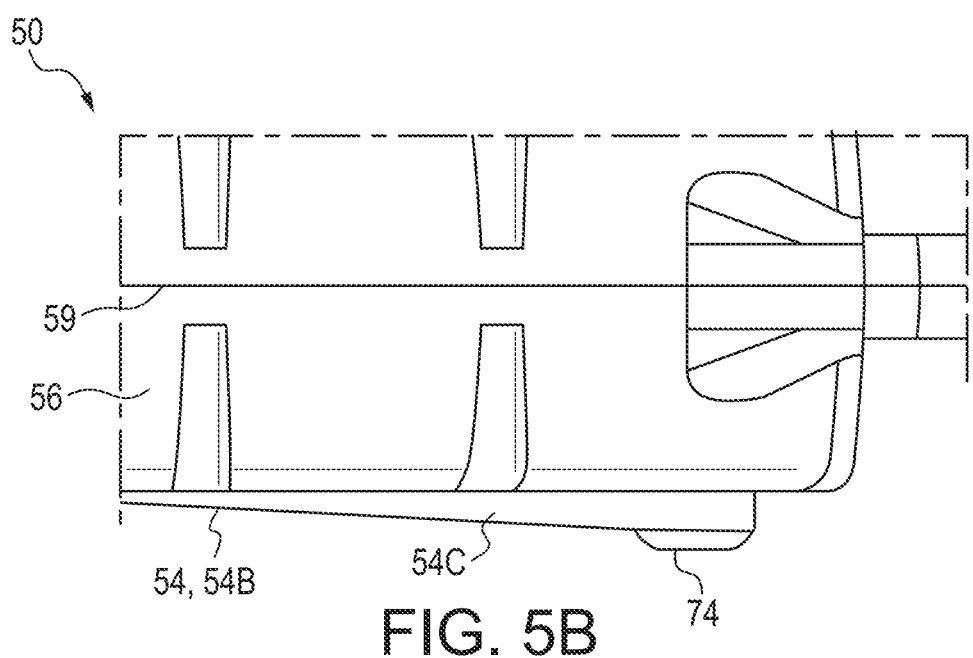
FIG. 5B is a partially-fragmented, schematic, plan view of the drum housing, disclosed in relation to the present subject matter showing at least one grommet or foot.

Now referring to embodiments depicted in FIGS. 5A and 5B, one or more grommet 74 or feet could be provided, in particular instances, along a rear wall 54 of the drum housing 50. Such feet 74 can serve to improve overall stability of drum housing 50 and protect any work surfaces when laid horizontally with rear wall 54 facing down.

Flexible Cable

Flexible drain cleaning cable used in devices, machines and systems of the present subject matter typically comprises a protective outer sheath and rotatable inner core located within the sheath and extending along the entire length of the cable. Such flexible cable includes a driver end coupling, typically crimped onto an end portion of the core, and at least one collar crimped on an end portion of the cable that is opposite the driver end. Additional collars may serve to protect the cable (including inner core and/or outer sheath) from damage caused by hardware—such as setscrews during use—and could also provide precise locations for other hardware used for tool spacing purposes.

Figure 6A:
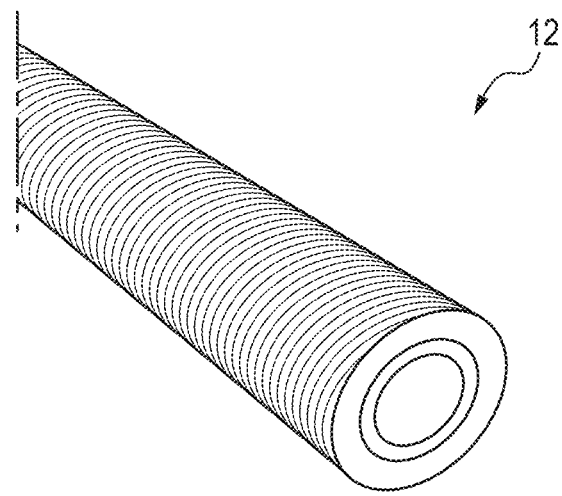
FIG. 6A is a schematic perspective end view of a portion of a typical flexible cable, disclosed in relation to the present subject matter, with its outer sheath removed.
Figure 6B:
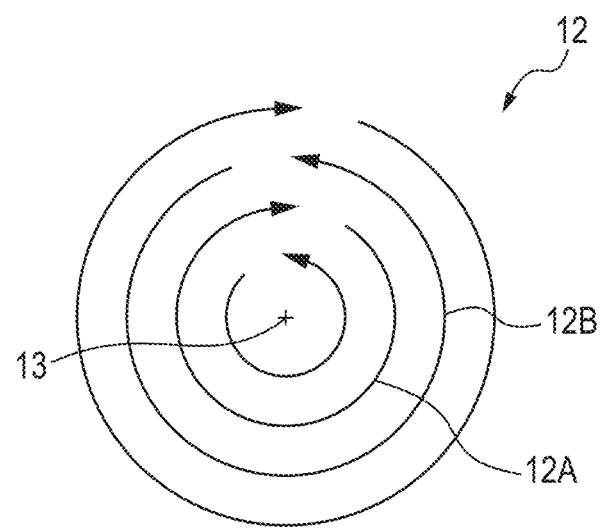
FIG. 6B is an illustrative, schematic cross section of flexible cable, shown in FIG. 6A, depicting winding directions of layers of wire, for the present subject matter.

Flexible cable of the present subject matter advantageously transmits torque from the transmission assembly to the distal end portion of the cable, at which end there is removably mounted a suitable sewer-, drain-, or pipeline-cleaning tool or attachment. As will soon be understood by skilled sewer-, drain-, and pipeline-cleaning individuals in this profession, torque transmission is performed by the inner intertwined wires or core 12 (FIG. 1) of cable 10, which rotates within (and relative to) outer sheath 14. An inner rotating core of such intertwined wires, could be constructed, for torque transmission purposes, of high tensile strength wires, for example steel, wrapped around an inner core. Flexible cable of the present subject matter includes multiple strands of axially disposed wire as depicted in FIG. 1. Multiple layers of such wire, radially disposed as illustrated in FIG. 1, along with sheath 14 surrounding the inner core 12, typically provide cable 10 with an outer diameter, which affects the resulting flexibility of the cable 10, and also the outer diameter. Thus, a range of pipe sizes can effectively be cleaned by the drain cleaning devices, machines, apparatuses, and systems of the present invention. Moreover, flexible cables of the present subject matter such as flexible cable comprising a core of plural layers of intermeshed wire, may or may not contain layers where wire layers are wound in alternating opposing directions. It can be appreciated by those skilled in this art that such core comprising wire layers wound in alternating opposing directions would be capable of withstanding higher torque in either the clockwise or counterclockwise direction. FIG. 6A schematically depicts the internal cable 12 of the flexible cable 10 of FIG. 1, in which the outer sheath 14 is removed. FIG. 6B is a schematic cross section of internal core 12 depicting a multiplicity of elongated lengths of wire disposed along a longitudinal axis, extending into FIG. 1, wherein plural layers of such wire, wherein such layers extend radially outwardly from such an axis. FIG. 6B schematically depicts a plurality of radially outwardly disposed layers, with an outer layer being wound one way about such an axis, and an inner or preceding layer being wrapped the other way, or in the opposite direction, about such an axis. Accordingly, in many embodiments of the present subject matter, the rotatable cable 12 includes a plurality of wound wire layers. Such plural wound wire layers can include a first wire layer 12A wound in a clockwise direction about a center axis 13 of cable 12, and a second wire layer 12B wound in a counterclockwise direction about center axis 13, as depicted in FIG. 6B. Second wire layer 12B is located immediately adjacent first wire layer 12A. Cable 12 may include additional layers. It is moreover clear that the present subject matter includes flexible cable embodiments including those using a rotatable shaft of metal which could be hexagonal in cross section, or which could be circular in cross section, viewed along the axis of rotation of core 12.

Figure 7A:
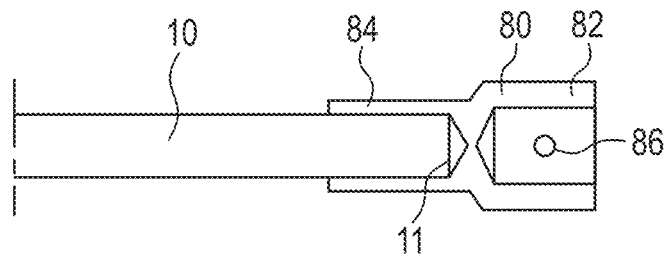
FIG. 7A is a partially-fragmented, schematic cross-sectional view of a near, proximal, or driven end of typical flexible cable, in relation to the present subject matter.

The driver end portion of such drain cleaning cable is the location at which mechanical power is transferred from the transmission assembly. The fitting to which the transmission assembly is coupled is typically mechanically crimped onto an end portion of the flexible cable, and comprises a bucket end type configuration, with an assembly of a shoulder screw, pin, detent pin, and/or shear pin to function as a coupling pin to connect the transmission to the crimped fitting of flexible cable 10. FIG. 7A schematically illustrates a cross section of a crimped fitting or coupling 80. Specifically, the fitting 80 is crimped or otherwise engaged to a proximal end portion 11 of flexible cable 10. The fitting 80 includes a receiving face or region 82 for receiving a source of rotary power, and a cable receptacle 84 for receiving the proximal end portion 11 of the cable 10. The receiving face or region 82 includes a shoulder screw 86 or coupling pin for securing to a transmission assembly 170 (FIG. 10) upon engagement therewith. One or more shear pin(s) can be used to limit the torque to which such cable 10 is exposed.

The sheath 14 surrounding shaft or inner core 12 is typically constructed as a composite, with a fibrous membrane located between two layers or regions of polymeric materials. Such polymeric materials are typically chosen for wear resistance properties and chemical compatibility, while the fibrous layer is chosen to increase tensile strength of such cable. The sheath may also comprise a single layer. Generally, the sheath is typically cut slightly shorter than a length of inner shaft or wire core, such that a section of the rotating shaft or core is exposed on both ends of a predetermined length of cable in order to crimp and/or insert suitable fittings for a drain cleaning machine or system.

Figure 7B:
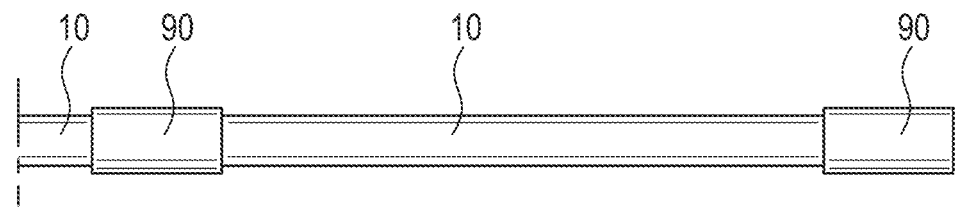
FIG. 7B is a partially-fragmented, schematic view, showing plural sections of flexible cables engaged together.

In certain embodiments, custom cleaning tools may be fastened to the shaft or inner core of the flexible cable using set screws. To prevent cable damage or fraying from over-tightening such set screws, collars may be crimped onto the cable, in order for screws to engage. Such end tools, designed to slide over the collars, provide a rigid surface for the set screws, and act as a shield for the inner shaft or individual wires that make up the interior of such flexible cable. FIG. 7B schematically illustrates multiple sections of cable 10 adjoined or engaged with each other using collars or unions 90.

Such cable assembly typically also includes an effective amount of a quantity of lubricant injected into a gap between the inner core 12 and outer sheath 14 to reduce friction between sheath 14 and the rotating inner shaft or core 12, as depicted in FIG. 1. It has been found that such cable, when soaked in commercially available lubricant for a predetermined period of time will cause lubricant to seep into wire gaps between layers.

Typically, when utilizing such flexible cable with the drain cleaning devices described herein, the length of flexible cable will depend upon outer diameter, D, of the flexible cable that is used. In particular, for a ¼ inch D, a typical cable length is about 50 feet. In addition, for a 5/16 inch D, a typical cable length is about 70 feet. It will be understood that drain cleaning systems of the present subject matter can utilize a wide range of lengths of flexible cable, such as less than 50 feet and greater than 70 feet.

Although the present subject matter is described in conjunction with flexible cable, it will be understood that conventional drain cleaning cable within a sheath could potentially be used with the systems described herein. In addition, the present subject matter includes use of unidirectional flexible cable. It is thus contemplated that various sheaths and flexible cable enclosures can be used such as, but not limited to, generally commercially available hydraulic or pneumatic tubing, and hydraulic or pneumatic hose, as well as other polymeric materials, non-polymeric materials, and composite materials, metal, and the like, and combinations thereof. It is further contemplated that the sheath may include a single layer, or multiple layers, with or without strengthening membranes.

Provisions for Rotatably Mounting Cable Carrier in Housing

Figure 8:
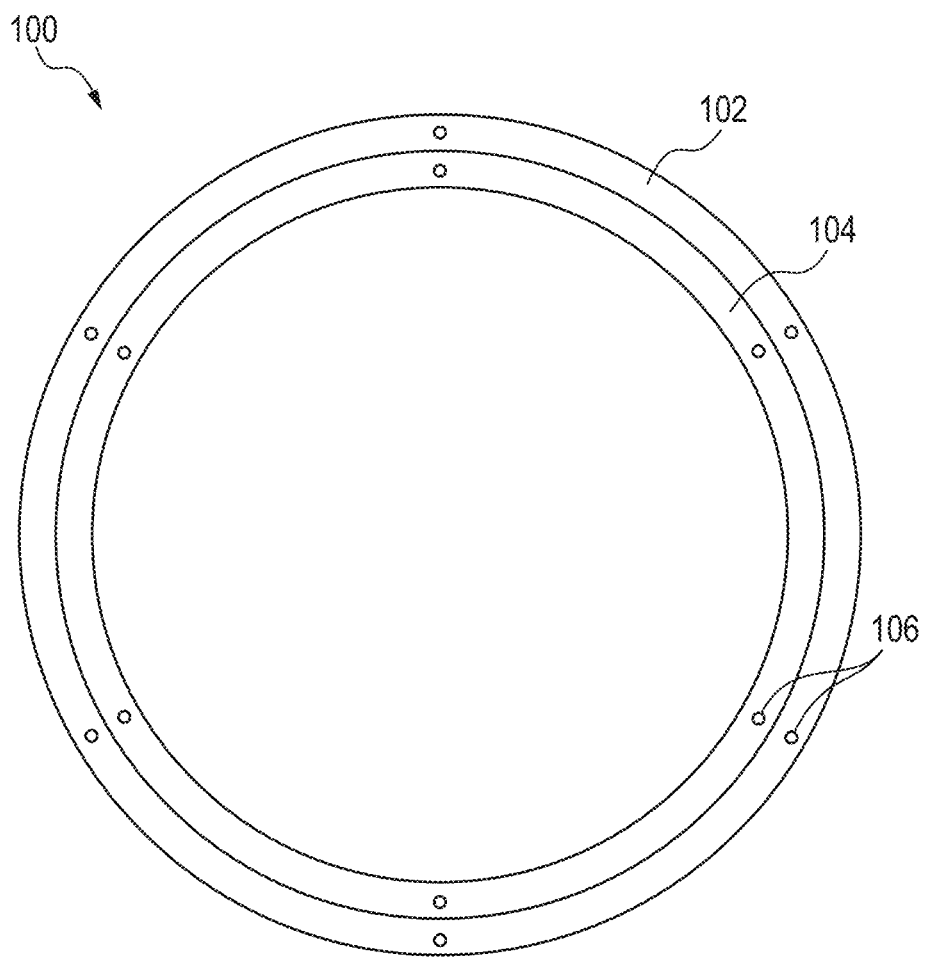
FIG. 8 is a schematic view of a bearing assembly often used for the drain cleaning devices, machines, apparatuses, and systems of the present subject matter.

In many embodiments, mounted within an inner region of drum housing 50 is a turntable-style bearing assembly 100, more commonly referred to as a "lazy susan" or slewing ring-type bearing assembly. The primary function of such a bearing assembly 100 is to provide smooth, rotary motion for an internal cable carrier 110, which rotates about an axis Y (FIG. 9) as cable 10 is extracted from, and retracted into, the drum housing 50. FIG. 8 schematically illustrates such a typical bearing assembly 100.

Such a bearing assembly 100 typically comprises at least two races 102 and 104—one being an outer race 102; the other being an inner race 104—and includes a plurality of ball bearings positioned between the races 102 and 104, as rolling elements. Such a bearing assembly 100 may or may not contain a cage to separate the bearings. Thus, in the embodiment of FIG. 8, bearing assembly 100 includes outer race 102 and inner race 104. Bearing assembly 100 includes plural ball bearings (not shown) located between the races 102 and 104. Inner and outer races 102, 104 may or may not include drilled and tapped holes 106, to attach bearing assembly 100 to an interior face of drum housing 50. Outer race 102 is used to support rotatable cable carrier 110.

In certain versions, the holes 106 in both races 102, 104 may or not be made identical; but often are drilled and tapped to provide secure fastening directly to bearing assembly 100, without requiring a nut, and thus is a configuration preserving space.

Although various embodiments of the drain cleaning machines and systems use a lazy susan-type bearing assembly for rotatably supporting the cable carrier, the present subject matter includes variations and alternate provisions. For example, one or more rollers could be utilized to rotatably support the cable carrier. In addition, one or more bushings could be utilized. One or more low friction pads could be positioned between cable carrier 110 and drum housing 50. In addition, it will be understood that such provisions could be located along an interior surface of front wall 52 of the drum housing 50 instead of, or in addition to, locating such provisions along the rear wall 54.

Cable Carrier

Figure 9:
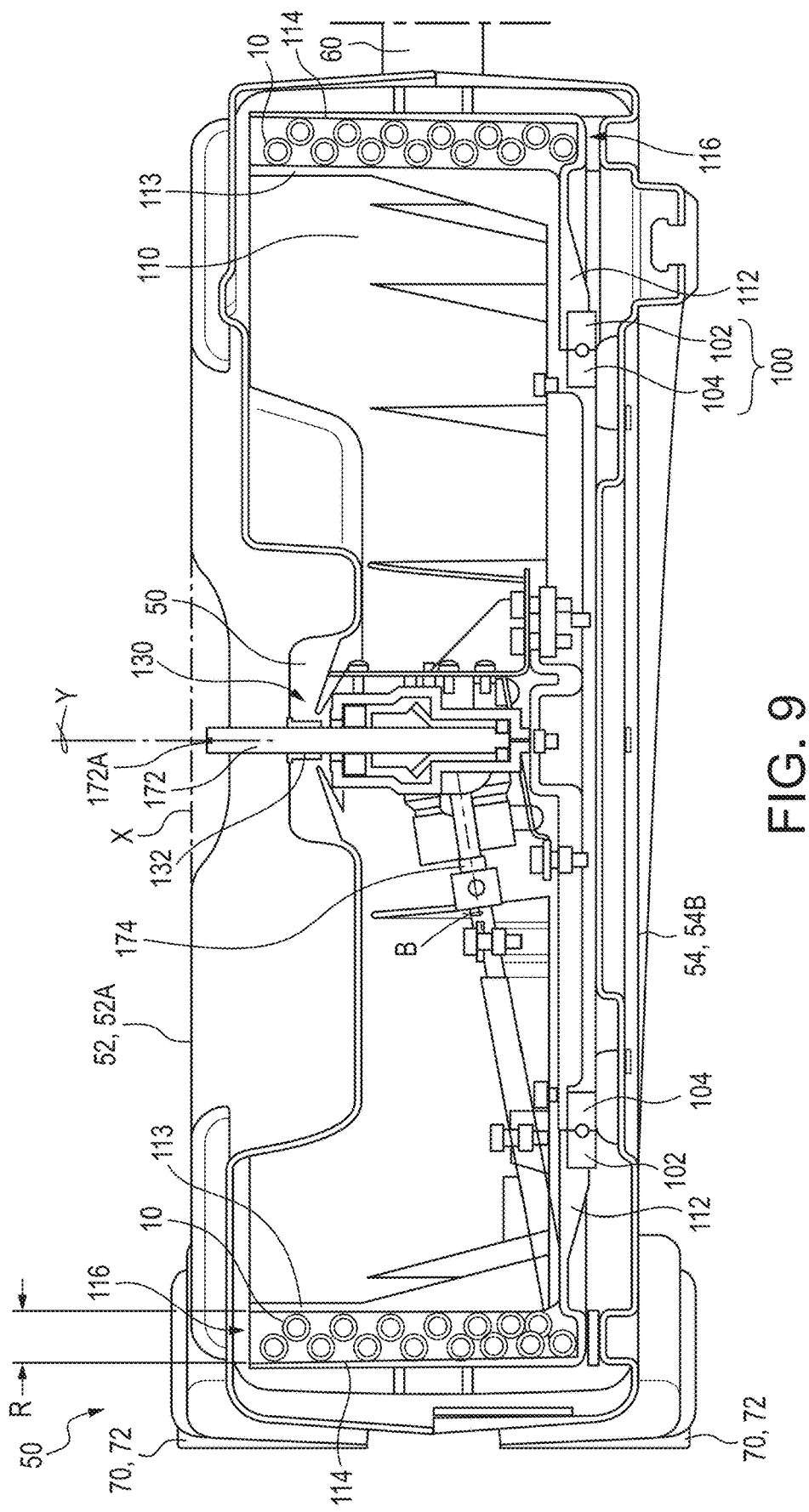
FIG. 9 is a schematic cross-sectional view, showing a typical drain cleaning device, machine, apparatus and system in accordance with the present subject matter.

Positioned within the drum housing 50 is a rotatable cable carrier 110. There are several useful functions provided by the cable carrier 110. A primary function is to store longer lengths of flexible cable 10 in an orderly fashion (FIG. 9) when not in use, thereby enabling a user to extend, or retract, preselected lengths of cable 10 smoothly, relative to the cable carrier 110, whenever such lengths of flexible cable 10 are desired to be so used. FIG. 9 depicts a schematic cross section of drum housing 50, with a drum or cable carrier 110 rotatably mounted therein. The cable carrier 110 is typically circumferentially shaped and includes a rear wall 112, as well as a circumferential side wall 114. As previously noted, cable carrier 110 is advantageously rotatably supported within drum housing 50 by lazy susan bearing 100. One or more bushings 132 (FIG. 9) can be used to promote rotation of an input shaft 172 of the transmission assembly 170 (FIG. 9) independently from the drum housing 50. Such bushings 132 may also serve to provide rotational support of the input shaft or component 172. In particular versions, a distal face 172A of the input shaft or component 172 is located below the plane X of the front wall 52, as shown in FIG. 9. Operationally, the input shaft or component 172 is a rotary power-providing input component of the transmission assembly 170, shown in FIGS. 10-13. The configuration depicted in FIG. 9 reduces potential for damage to the input shaft 172, particularly when the drum housing 50 is positioned horizontally on its front wall 52. And when the drum housing 50 is positioned horizontally on its rear wall 54, the front wall 52 or plane X constitutes the highest location of drum housing 50.

Also, the cable carrier 110 can be configured to provide a cable channel 116 in which the flexible cable 10 is stacked or coiled, which is illustrated in FIG. 9. The cable channel 116 is typically located alongside an interior face of the circumferential side wall 114, and in many versions between the circumferential side wall 114 and a secondary internal side wall 113. In such versions, the side walls 113 and 114 extend transversely from the rear wall 112. And in certain embodiments, the secondary internal side wall 113 is typically concentrically positioned within the side wall 114 and is spaced therefrom by a radial distance R. Thus, in such versions, a radial distance R constitutes a width dimension of cable channel 116. Rear wall 112 can also include a depression, or recessed receiving region, to facilitate retaining of the flexible cable 10 near the side wall 114. FIG. 9 further illustrates the bearing assembly 100 with the races 102, 104 rotatably supporting the cable carrier 110 within the interior of the drum housing 50.

In certain embodiments, cable channel 116 is sized to reduce the potential of adjacent regions of flexible cable 10 from laying immediately alongside each other with relatively large areas of contact between cable regions occurring. Such a configuration can lead to "pinching" of cable 10 within cable channel 116 and in certain instances can result in cable entanglement. Cable channel 116 is preferably sized to exhibit a width R that promotes staggered stacking of lengths of flexible cable 10 within the cable channel 116. In particular versions, the width R of the cable channel 116 will be within a range defined in Formula (I) of from 1 to 2 times an outer diameter D of the flexible cable 10:

$$1.0 \times D < R < 2.0 \times D \qquad (I)$$

As noted, D is the outer diameter of sheath 14 of the flexible cable 10 used in relation to a drain cleaning device, machine, or system of the present subject matter. However, it will be understood by one of ordinary skill in the art that the present subject matter is not limited to this aspect and includes other configurations and widths for the cable channel.

Figure 10:
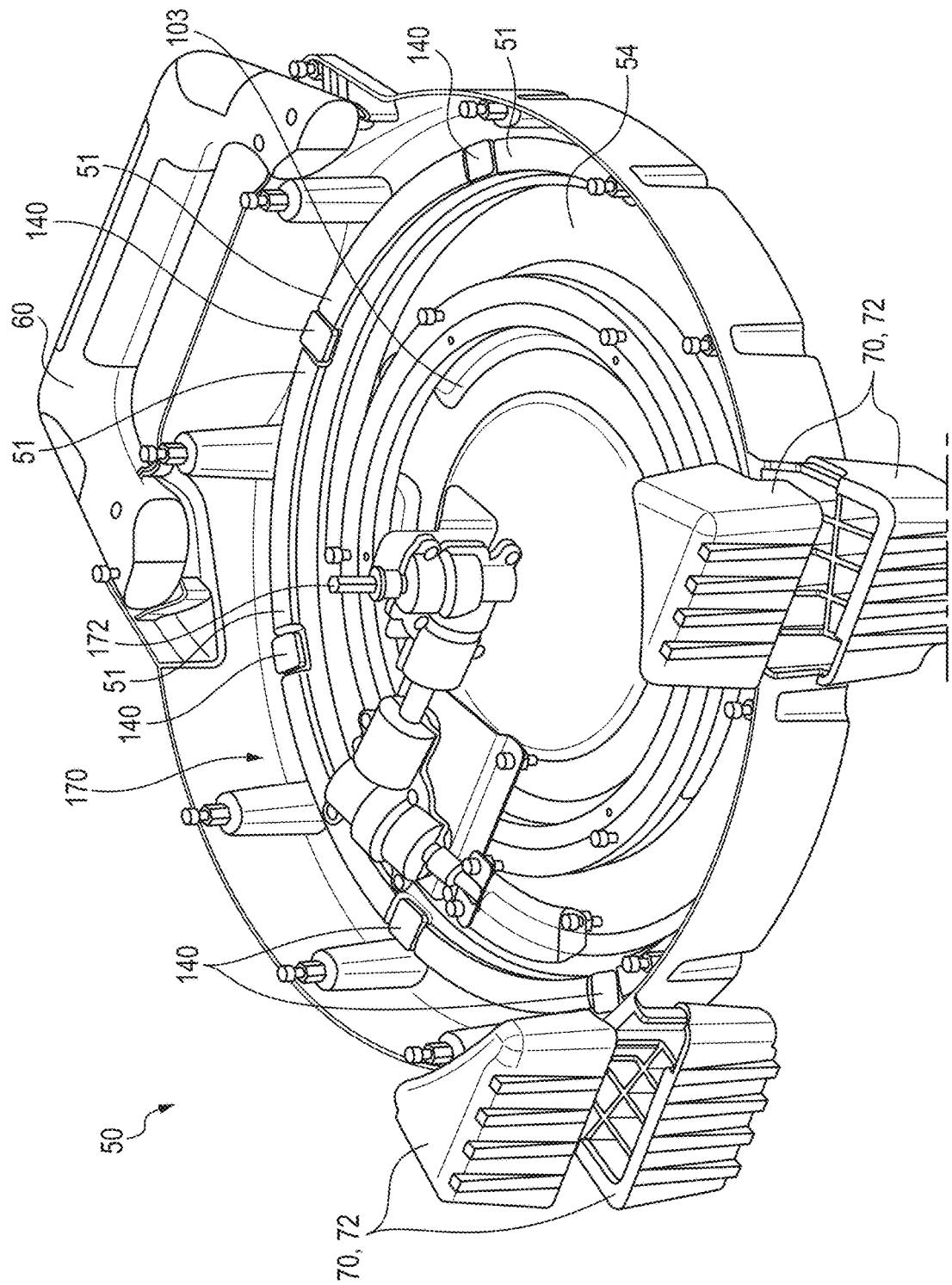
FIG. 10 is a schematic perspective view of the drain cleaning apparatus, device, machine, and system of FIG. 9, illustrating additional aspects of the system.

FIG. 10 depicts yet another view of the system with inner cable carrier 110 removed. Thus, in this depiction, the transmission assembly 170 and a cable retention platform (described in greater detail herein) are shown "floating." Underneath rotatable cable carrier 110 (not shown in FIG. 10), i.e., along the rear wall 54, are a plurality of optional wear pads 140 typically made from a suitable polymeric material. Typically, the wear pads are formed from a material exhibiting a relatively low coefficient of friction. Also, the material of the wear pads will exhibit a coefficient of friction that is less than the coefficient of friction of the material of the drum housing. Such wear pads 140 are configured to make contact with the rotating cable carrier 110 in the event the cable carrier 110 is stressed and contacts an interior of drum housing 50. In many versions, the wear pads 140 are raised, and extend above at least one adjacent surface of the drum interior (as illustrated in FIG. 10 by surfaces 51). Such wear pads 140 also serve a structural function. In the event the machine is dropped or otherwise stressed, the pads 140 make contact with the cable carrier 110 to safely redirect forces to drum housing 50. The pads 140, preferably adhesively attached to the interior of the drum housing 50, could also be fastened mechanically. Also, numerous potential embodiments of the present subject allow for pad replacement. FIG. 10 depicts one or more optional clamp plates 103. Such clamp plates 103 are located between the drum housing 50 and the inner race 104 of bearing assembly 100. One or more clamp plates may be needed to distribute loads and forces between the bearing assembly 100 and drum housing 50.

Figure 11:
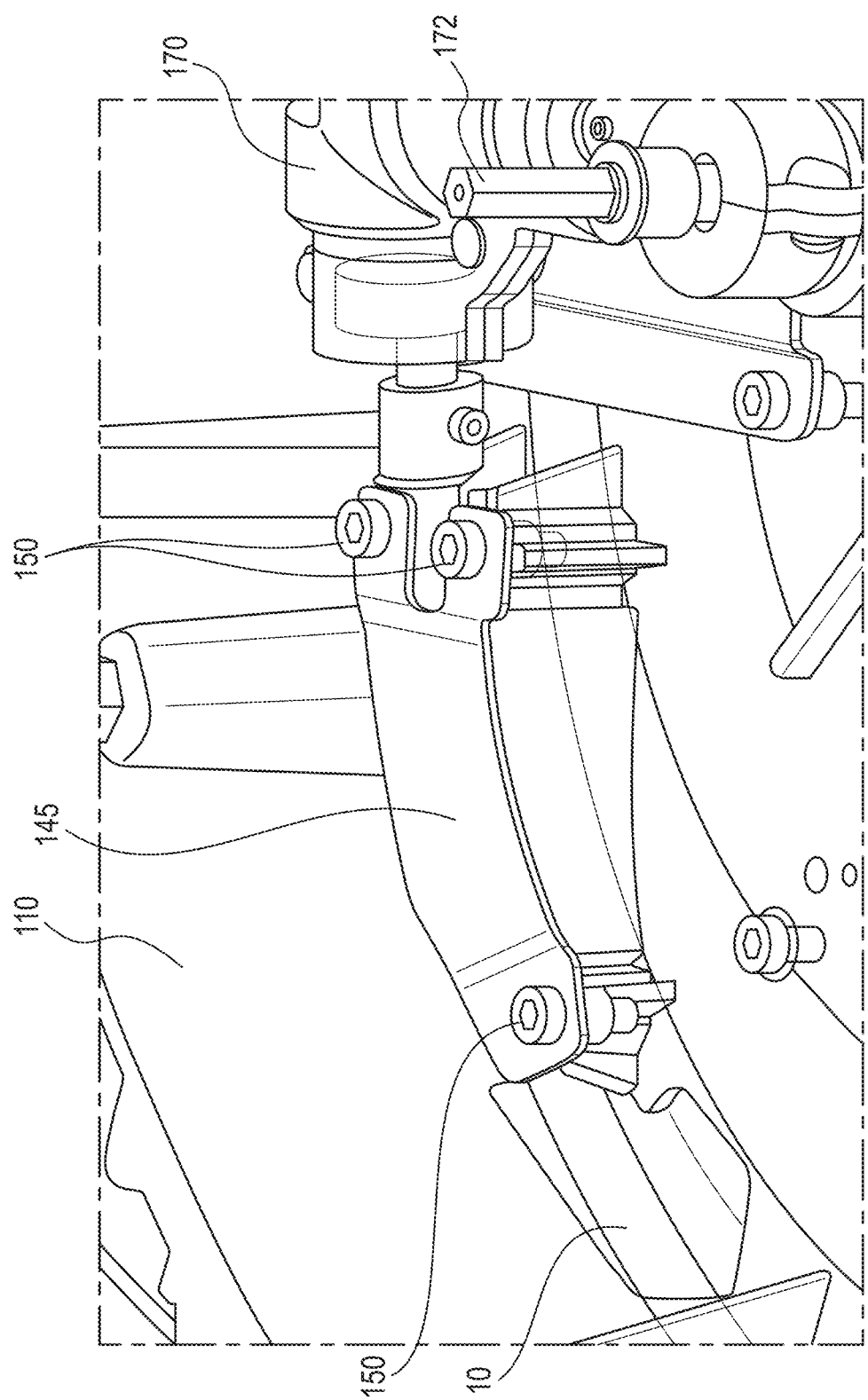
FIG. 11 is a detailed view of an embodiment of a cable retention assembly optionally typically used within the drain cleaning system of the present subject matter.
Figure 12:
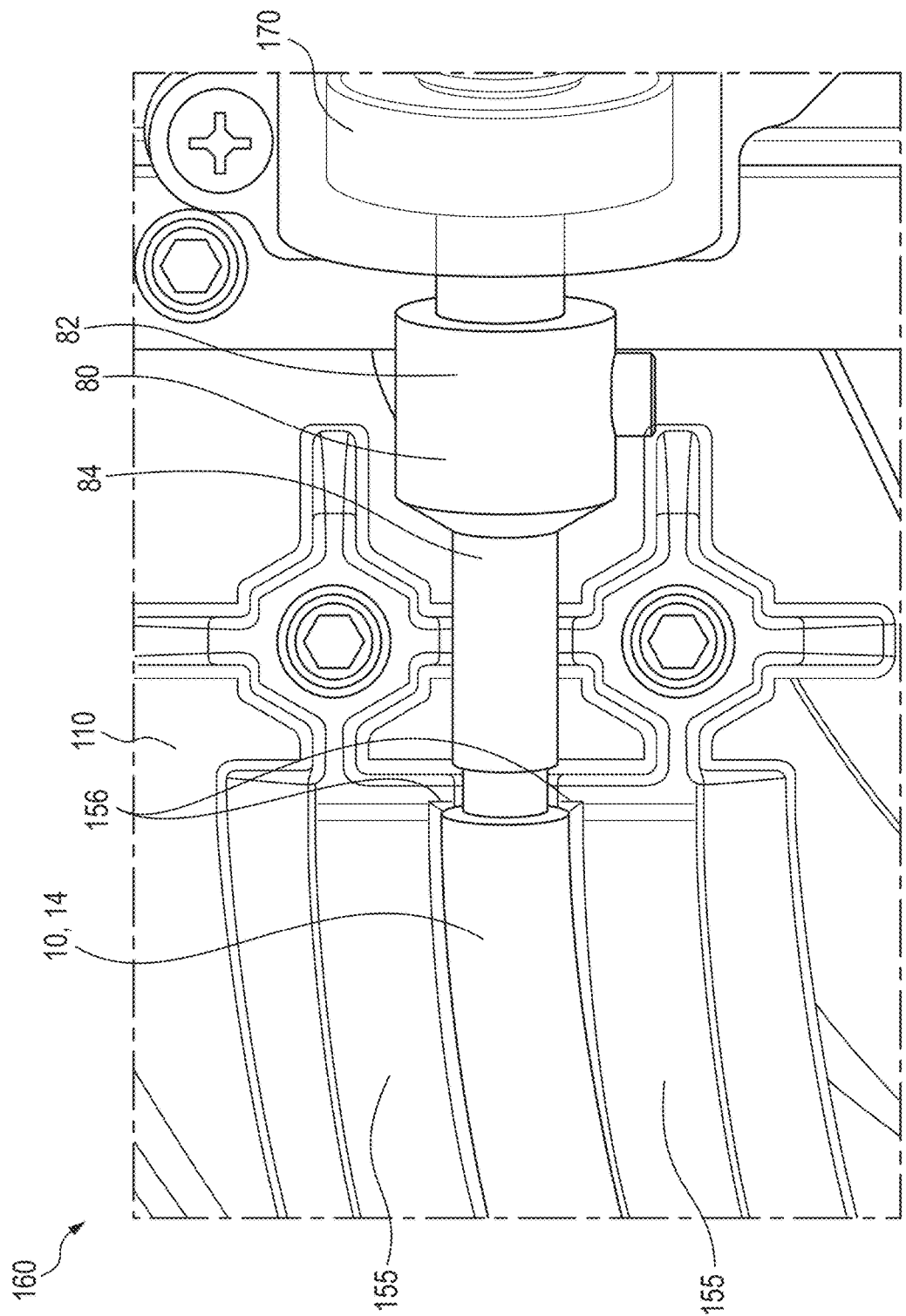
FIG. 12 is a detailed view of an embodiment of a cable retention platform optionally used in the drain cleaning apparatus or system of the present subject matter.

In certain embodiments, the present subject matter also includes a cable retention assembly. FIG. 11 illustrates an end portion of a flexible cable 10 within a cable carrier 110 which is rotatably supported within the drum housing 50. A plate 145 or fastening component can be used to assist in securing the flexible cable 10 within the cable carrier 110, and especially along rear wall 112 (FIG. 9) of the cable carrier 110. One purpose of such supporting structure, in addition to securing the flexible cable 10, would be to reduce the amount of "unrestricted length" of the flexible cable 10 permitted within drum housing 50. The more secure the flexible cable 10, the less the potential for cable "flip over" situations, whereby "twisting" of lengths of flexible cable occur within the cable carrier 110 when flexible cable 10 encounters a "difficult" or otherwise unyielding obstruction. When such situations occur, a plate 145 (FIG. 12) proves useful. The plate 145 is designed to be removable from housing 50 (FIG. 10 whenever a user desires to replace or re-orient the flexible cable 10 within channels or troughs formed in a retention platform 160 (FIG. 12). For purposes of removably securing plate 145 to housing 50, a bolted connector such as self-tapping screw 150 (FIG. 11) could be used. Plate 145, typically positioned over sheath 14, causes interference, to hold sheath 14 in place.

Referring to FIG. 12, cable carrier 110 preferably also includes the cable retention component 160, which provides an internal region of the cable carrier 10 with an integrated geometric configuration designed to constrain and direct flexible cable 10 to a channel such as cable channel 116 (FIG. 9) adjacent structure that stores neatly coiled lengths of the remainder of the flexible cable 10. Such component or region 160 (FIG. 12), generally referred to as a cable "retention platform," allows flexible cable 10 to take the largest possible bend with respect to the location of the transmission assembly 170 and/or certain gearboxes 175 and 180 (FIG. 13) discussed in greater detail below.

In the top view of the cable retention platform 160, schematically illustrated in FIG. 12, one or more lips 155, 156 or raised wall regions (FIG. 12) allow the user to correctly insert and seat the flexible cable 10 in the platform 160 in such a way that the sheath 14 does not contact the coupling 80, which rotates as the flexible cable 10 of the drain cleaning machine is operated. One such pair of lips 155 (FIG. 12), serving to limit lateral movement of the flexible cable 10, is typically spaced apart from one another by a distance sufficient to receive the flexible cable 10 secured therebetween. Raised wall regions 156 serve as "walls" to securely locate the sheath 14, so that it is securely held in place. The specific configuration of the walls 156 serves to prevent exterior surfaces of the sheath 14 from contacting the rotating crimped drive lug, an equivalent rotating fitting, and/or the rotating coupling 80 (FIG. 7A) associated with the flexible cable 10. Structural components of cable retention platform 160—such as the lips 155 and/or the walls 156—are either integrally "formed" along with, or are affixed to, the rear wall 112 of the cable carrier 110. It will be appreciated by those skill in this profession, that the present subject matter includes other configurations for the cable retention platform 160. Furthermore, it will thus be understood that the present subject matter includes devices, machines, apparatuses, and systems that do not use such components or platforms.

Transmission Assembly

The drain cleaning devices, machines, and systems of the present subject also comprise an assembly for transferring rotary power from a handheld drill or other power source to the flexible cable 10. Such transmission of portable power enables a user to maintain a stationary location at which a handheld power drill or other handheld power source can be connected. In many embodiments, such a transmission assembly includes an input component or shaft that will rotate about an axis, but not translate, with respect to components of the drain cleaning devices, machines, and/or systems when operatively used as intended. Such a transmission assembly also comprises an output component for delivering rotary power to an end portion of flexible cable, located within an interior region of drum housing 50 and more particularly within cable carrier 110. The transmission is depicted as transmission assembly 170 in referenced figures.

A wide array of rotary power sources can be coupled to the input component or shaft of the transmission assembly 170, to provide rotary power initially to the input of the transmission assembly and ultimately to the flexible cable. Conventional handheld power drills can be used for such a purpose. Furthermore, although battery-powered handheld, portable drills are preferred for many applications, corded drills can also be used. It is also contemplated that other portable rotary power sources can be used. In addition, impact power tools could be used to supply rotary power to the transmission.

In many embodiments, the input shaft or component 172 of the transmission assembly 170 is located and accessible along the front wall 52 of the drum housing 50. And, in particular versions, the input shaft 172 is located at a central location along the front wall 52 of the drum housing 50, such as shown in FIG. 2A. Positioning the input shaft 172 at a central location and orienting the shaft 172 to rotate about an axis Y as shown in FIG. 9 that is parallel, coextensive, or coaxial with an axis of rotation of the cable carrier 110, results in improved operational efficiencies and additional benefits.

Figure 13:
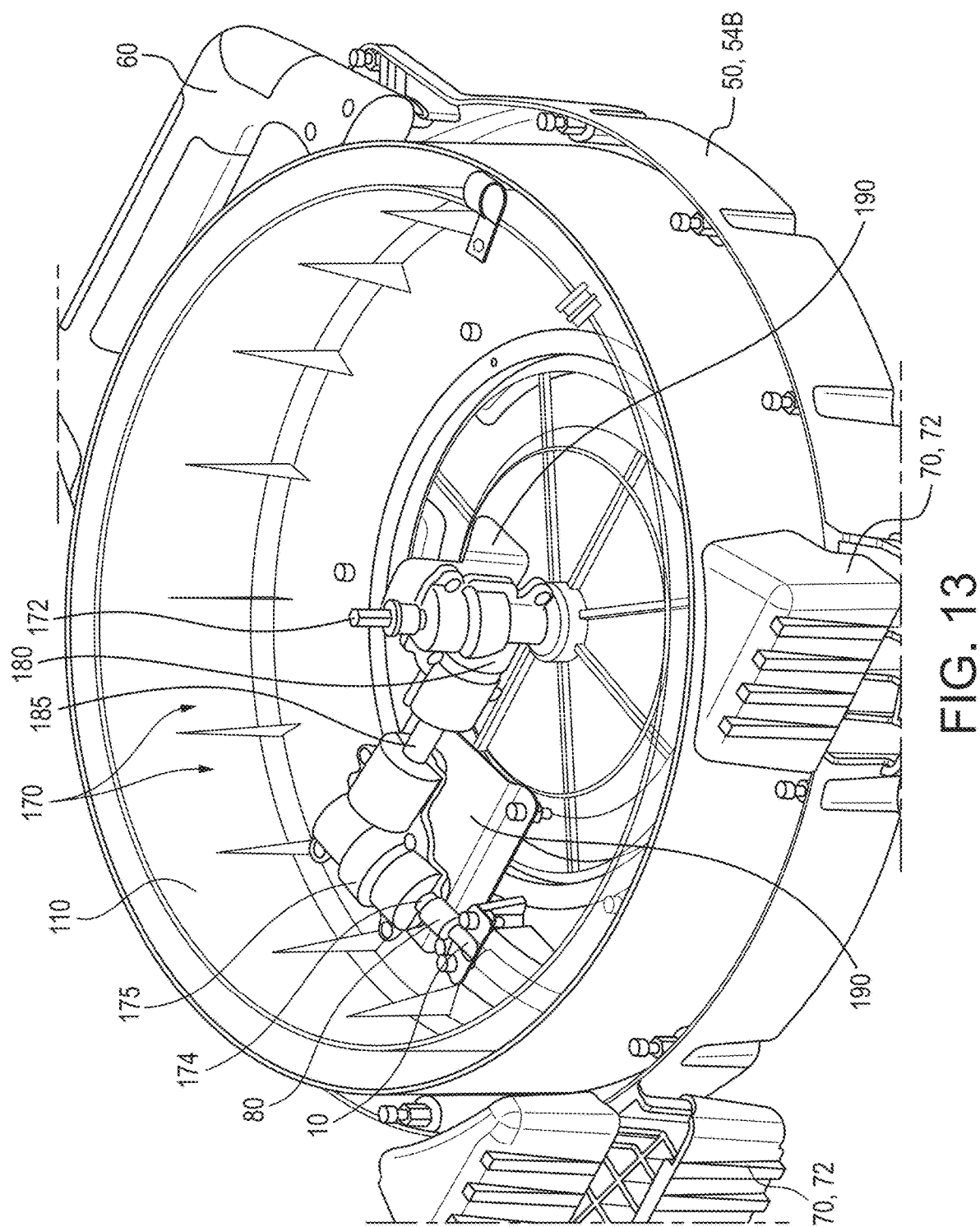
FIG. 13 is a partially-fragmented, schematic perspective view of the drain cleaning machine, apparatus, and system, showing additional aspects of the system.

Referring to FIG. 13, the transmission 170 may comprise one or more gears that redirect power from a conventional rotary power source such as a user supplied handheld rotary-powered drill or other such tool. The transmission assembly 170 may also include at least one belt. The present subject matter also contemplates still other alternative configurations, such as, but not limited to flexible cable having at least two bends, and/or bent flexible cable associated with a particular gearbox. Such an input shaft 172 can, e.g., take the form of an elongated shaft, hexagonal in cross section, that accepts a multipoint Jacob's chuck or other multipoint connection from a user-provided handheld power source. The present subject matter can therefore include many other configurations for the input shaft. Non-limiting examples of other configurations for the input shaft 172 can thus include shaft cross sectional shapes that are square, triangular, round, oval, and otherwise shaped. Power is typically transferred from the input shaft, through a series of gears, which may include one or more gearboxes. Such gearboxes may comprise individual mitered gears, beveled gears, or spiraled-bevel gears, any one of which may also be redirected to an output component or shaft 174 of transmission 170, and ultimately to a crimped fitting found on the flexible cable 10. The flexible cable 10 can, moreover, be coupled to a shaft of such a gearbox with a pin or shoulder screw. In many versions, it may be preferable to removably affix or couple flexible cable 10 to a shaft on such a gearbox with a headed detent pin. The present subject matter includes other coupling provisions such as shear pins or other connecting pins, known in the art.

FIG. 13 thus presents an example of the internal transmission assembly 170, comprising at least two 90 degree gearboxes 175 and 180 coupled together with an assembly that includes a drive 185 and optional components including at least one spring, and/or shear pin, screw, and/or key. Such a transmission assembly or drive train 170 advantageously transfers rotary power applied at the input shaft or component 172 such as for example by a drill, to the coupling or fitting 80 of the flexible cable 10.

Conventional brackets 190 can be used to orient the gearboxes 175 and 180 in a direction desired for desired operation, and are preferably removably fastened to the cable carrier 110. Because the brackets 190 are fastened to the cable carrier 110, the transmission assembly components will rotate with the cable carrier 110 as flexible cable 10 is pulled out from the drum housing 50. Kinematically dependent upon rotation of the cable carrier 110 (within the drum housing 50) are the following components of a device, machine, apparatus, and system of the present subject matter: Input and output shafts or components 172 and 174 (of transmission assembly 170); the internal rotating core 12 (of flexible cable 10); and a user-supplied handheld power source (not shown). Thus, as the cable carrier 110 rotates about axis Y (FIG. 9), whenever preselected lengths of flexible cable 10 are extended from, or retracted into, the drum housing 50, the rotary input shaft or component 172 (of the transmission assembly 170) will rotate about the axis Y. Any rotation due to torsionally-based potential energy will be directed toward an unrestricted end of cable having the cleaning tool, if input shaft or component 172 is prevented from rotating, whenever cable carrier 110 drum is rotated about axis Y relative to drum 50, e.g., when a drill handle is "held" or a tool restricted from rotating.

In certain versions of the present subject matter, the transmission assembly 170 depicted in FIGS. 10-13, is oriented such that the rotational axis B (FIG. 9) of the output component 174 extends at an angle that is not transverse to the axis Y of the input shaft or component 172. Referring to FIG. 9, such a non-transverse angle that is located between rotational axis B of output 174 and axis Y of the input 172 is typically in a range of from about 91° to about 135° and generally from about 95° to about 125°.

The transmission 170 in the apparatuses and systems of the present subject matter may optionally comprise a clutch. The clutch may or may not be adjustable, but is configured to disengage rotary power from the user-supplied input device to either the input gearbox 175 and/or the gearbox 180 or after the gearbox 175 and/or gearbox 180 between input shaft or component 172 and drive coupling 80. In many embodiments of the present subject matter, the clutch selectively disengages or interrupts rotary power transfer from a rotating input component to flexible cable 10. Alternatively, or in addition, one or more shear pin(s) can be used in the transmission assembly 170 or drivetrain of the present subject matter. The clutches and/or shear pin(s) can, e.g., advantageously be located between the coupling and the gearbox shaft, between gearboxes, and/or between the input shaft and the external power source which, as noted, can be a drill.

The present subject matter also provides various methods of drain cleaning using the systems described herein. Generally, the methods comprise providing a drain cleaning machine, apparatus or device with one or more flexible cables as described. A distal end of flexible cable, typically also including a select tool removably attached to an end portion thereof, is inserted into a drain or sewer of interest, or other construct of interest. As will be understood, a proximal end of flexible cable can easily be attached to a transmission of the drain cleaning system. The method also comprises rotating the flexible cable about an axis, which results in the tool at the end portion of the flexible cable being rotated as well. Typically, such cable rotation is performed by rotatably driving the input shaft or component of the transmission assembly using a portable drill, preferably of the handheld variety, corded or battery-powered, or other portable power source. The method may additionally comprise extending or advancing, or reciprocally extending and retracting, flexible cable relative to a drum of the drain cleaning system.

The drain cleaning systems of the present subject matter could also be used with a wide assortment of tools, components, and accessories. For example, in certain applications, the drain cleaning systems of the present subject matter could be used with "knockers," which are tools often attached to a distal end portion of drain cleaning cable and are used to effectively remove rust, clean away dirt, and remove other debris from within a sewer, pipeline or drain line. Most knockers include one or more sections of chain which are flung radially outwardly as the tool is rotated in the above described way. One or more carbide inserts can be brazed or otherwise attached to such a chain section, to promote cleaning and reduce wear of internal surfaces of drains and pipe.

In many embodiments, the drain cleaning apparatuses of the present subject do not include an internal power source such as an electric motor, which could, e.g., be mounted within a drum housing or otherwise mounted on several of above-described components of a drain cleaning system. As a result, in such embodiments, the drain cleaning devices, machines and apparatuses, and systems are free of various power sources including internal or integral power sources, such as known electric motors.

Thus, various specific versions or embodiments of the drain cleaning devices, machines, apparatuses, and systems of the present subject matter are contemplated.

In one embodiment, the present subject matter is directed to a drain cleaning device, machine, apparatus, and system comprising a drum housing defining an interior region, and including a cable carrier rotatably mounted within the interior region. The drain cleaning device, machine, apparatus, and system further includes a transmission assembly mounted on the cable carrier, wherein the transmission assembly includes an input shaft or component, engageable to a power source, wherein the transmission assembly further includes an output component to deliver power to an end portion of the drain cleaning cable, wherein the cable end portion is located within the cable carrier.

In another embodiment, the present subject matter provides a drain cleaning device, machine, apparatus, and system comprising a drum housing which includes a front wall. The drain cleaning device, machine, apparatus, and system also comprises a transmission assembly disposed in the drum housing. The transmission assembly includes a rotatable input shaft or component, wherein the input shaft or component is accessible along the front wall and is located at a central location along the front wall.

In still another embodiment, the present subject matter provides a drain cleaning device, machine, apparatus, and system comprising a drum housing, including a rear wall spaced from the front wall, and a generally hollow interior region defined between the front and rear walls, further including a cable retention assembly disposed along the rear wall, wherein the retention assembly includes (i) a pair of lips spaced apart to receive the drain cleaning cable when disposed between the lips, and (ii) a removable plate positioned over at least one of a drain cleaning cable and the output component of the transmission assembly.

In yet another embodiment, the present subject matter is directed to a drain cleaning device, machine, apparatus, and system comprising a cable carrier rotatably mounted in the interior region, wherein the cable carrier includes a first circumferential outer wall and a concentrically disposed secondary wall, wherein the first and second walls define a cable channel, wherein the secondary wall is spaced from the first wall by a radial distance R, wherein the radial distance R is within a range according to formula (I): $1.0 \times D < R < 2.0 \times D$, wherein D is the outer diameter of the drain cleaning cable.

The present subject matter is also directed to various drain cleaning devices, machines, apparatuses, and systems disclosed. For instance, assorted drain cleaning devices, machines, apparatuses, and systems used in relation to rotary power sources, including a transportable powered tool, e.g., handheld battery-powered drills, are noted.

In one embodiment, the present subject matter provides a device, machine, apparatus, and/or system comprising (i) a rotary power source and (ii) a drain cleaning apparatus including a drum housing defining an interior region, a cable carrier rotatably mounted within the interior region of the drum housing, and a transmission assembly mounted on the cable carrier and including an input shaft of component for engagement to a rotary power source and including an output component for delivering rotary power to an end portion of drain cleaning cable within the interior region of the cable carrier.

In yet another embodiment, the present subject matter is directed to a device, machine, apparatus and/or system comprising (i) a rotary power source and (ii) a drain cleaning apparatus including a drum housing, wherein the drum housing includes a front wall, and a transmission assembly disposed in the drum housing. The transmission assembly includes a rotatable input shaft or component, wherein the input shaft or component is accessible along the front wall of the drum housing and is located at a central location of the drum housing along the front wall of the drum housing.

In still another embodiment, the present subject matter is directed to a device, machine, apparatus and/or system comprising (i) a rotary power source and (ii) a drain cleaning apparatus including a drum housing including a front wall, an oppositely directed rear wall, and a generally hollow interior region defined between the front wall and the rear wall. The device, machine, apparatus and/or system further includes a transmission assembly disposed in the interior region of the drum housing, wherein the transmission assembly includes an output component for delivering rotary power to an end portion of drain cleaning cable disposed within the interior region of the drum housing. The device, machine, apparatus and/or system also includes a retention assembly for a sheath of a drain cleaning cable, wherein the retention assembly includes (i) a pair of lips spaced apart to receive the drain cleaning cable disposed between the lips and (ii) a removable plate positioned over at least one of a drain cleaning cable and the output component of the transmission assembly.

In another embodiment, the present subject matter provides a device, machine, apparatus and/or system comprising (i) a rotary power source and (ii) a drain cleaner including a drum housing defining an interior region, a drain cleaning cable of defined length, and a cable carrier rotatably mounted in the interior region of the housing, wherein the cable carrier includes a first circumferential outer wall and a concentrically disposed secondary wall. The first wall and the secondary wall together define a cable channel, wherein the secondary wall is spaced from the first wall by a radial distance R, wherein the radial distance R is in a range according to formula (I):

$$1.0 \times D < R < 2.0 \times D \qquad (I)$$

wherein D is the outer diameter of a sheath of the drain cleaning cable.

In one aspect, the present subject matter provides a drain cleaning device, machine, apparatus and/or system comprising a drum housing defining an interior region, and including a cable carrier rotatably mounted within the interior region of the drum housing. The drain cleaning device, machine, apparatus and/or system further comprises a transmission assembly mounted on the cable carrier and including an input shat or component for engagement to a rotary power source, wherein the transmission assembly includes an output component for delivering rotary power to an end portion of the drain cleaning cable.

In another aspect, the present subject matter provides a drain cleaning device, machine, apparatus and/or system comprising a drum housing having a front wall, wherein the transmission assembly includes a rotatable input shaft or component centrally located along, and accessible through, the front wall of the housing.

In still another aspect, the present subject matter provides a drain cleaning device, machine, apparatus and/or system comprising a drum housing having a front wall, an oppositely directed rear wall, and a generally hollow interior region defined between the front and rear walls. The drain cleaning device, machine, apparatus and/or system further comprises a cable retention assembly disposed along the rear wall within the interior region of the drum housing. While the illustrated embodiments of the present subject matter show the cable retention assembly as unitary with the cable carrier (since the cable carrier shown was made by an injection molding process), if the cable carrier had been made, for example of metal, it can be appreciated that a functionally-equivalent cable retention assembly could be designed to be removably mountable to the metal cable carrier. The cable retention assembly of the present subject matter includes (i) a pair of lips spaced apart to receive the drain cleaning cable, and (ii) a removable plate positioned over at least one of the drain cleaning cable and the output component of the transmission assembly.

In yet another aspect, the present subject matter provides a drain cleaning device, machine, apparatus and/or system comprising a drum housing defining an interior region and a drain cleaning cable. The device, machine, apparatus and/or system further comprises a cable carrier rotatably mounted within the interior region of the drum housing, wherein the cable carrier includes a first circumferential outer wall and a concentrically disposed secondary wall. The first wall and the secondary wall together define a cable channel. The secondary wall is spaced from the first wall by a radial distance R, and the radial distance R is within a range according to formula (I): 1.0×D<R<2.0×D, wherein D is the outer diameter of the drain cleaning cable.

In still another aspect, the present subject matter provides a drain cleaning device, machine, apparatus and/or system comprising (i) a rotary power source and (ii) a drain cleaning apparatus including a drum housing defining an interior region. The drain cleaning device, machine, apparatus and/or system includes a cable carrier rotatably mounted within the interior region of the drum housing, and a transmission assembly mounted on the cable carrier and including an input component or shaft for engagement to a rotary power source. The transmission assembly further includes an output component for delivering rotary power to an end portion of drain cleaning cable.

In another aspect, the present subject matter provides a drain cleaning system comprising (i) a rotary power source and (ii) a drain cleaning apparatus including a drum housing, wherein the drum housing includes a front wall, and a transmission assembly disposed in the drum housing. The transmission assembly includes a rotatable input shaft, wherein the input shaft is accessible along the front wall of the drum housing and is located at a central location along the front wall.

In still another aspect, the present subject matter provides a system comprising (i) a rotary power source and (ii) a drain cleaning apparatus including a drum housing including a front wall, an oppositely directed rear wall, and a generally hollow interior region defined between the front wall and the rear wall, a transmission assembly disposed in the interior region of the drum housing. The transmission assembly includes an output component for delivering rotary power to a drain cleaning cable end within the interior region of the drum housing. The apparatus also includes a retention assembly for a sheath of a drain cleaning cable. The retention assembly includes (i) a pair of lips spaced apart to receive the drain cleaning cable disposed between the lips and (ii) a removable plate positioned over at least one of a drain cleaning cable and the output component of the transmission assembly.

In yet another aspect, the present subject matter provides a system comprising (i) a rotary power source and (ii) a drain cleaning apparatus including a drum housing defining an interior region, a drain cleaning cable, and a cable carrier rotatably mounted within the interior region of the drum housing. The cable carrier includes a first circumferential outer wall and a concentrically disposed secondary wall, the first wall and the secondary wall defining a cable channel, the secondary wall spaced from the first wall by a radial distance R, the radial distance R being within a range according to formula (I):

$$1.0 \times D < R < 2.0 \times D \qquad (I)$$

wherein D is the outer diameter of a sheath of the drain cleaning cable.

In yet another aspect, the present subject matter provides a method of drain cleaning comprising providing a drain cleaning apparatus. The apparatus includes a drum housing defining an interior region, a cable carrier rotatably mounted within the drum housing, and a drain cleaning cable. Typically, at least a portion of the drain cleaning cable is retained within the cable carrier. The method also comprises inserting a distal end of the drain cleaning cable into a drain line. And, the method comprises rotating the drain cleaning cable.

Additional Aspects

Torque Limiting Assemblies

Current drain cleaning practice typically involves low torque/high speed applications. In many instances, the conventional flexible cable cannot handle the high torque that the power source can supply. Also, the speed at which conventional cable rotates typically requires an operator to use a relatively slower feed rate into blockage, to "break up" and remove such blockage from the inner surfaces of sewers, pipelines, and other conduit, into which conventional drain cleaning equipment is introduced. It would therefore be advantageous for an operator to provide a torque limiting device to prevent potential cable damage. Preferably, the power source is a power drill. Yet, if the torque limiter on the drill is not set properly, damage to the cable could occur.

In additional aspects of the present subject matter, the drain cleaning device, machine, apparatus, and/or system includes a torque limiter assembly. Such a torque limiter assembly ideally prevents cable damage, otherwise occurring whenever an inexperienced operator is too aggressive in the operation of the flexible cable of a drain cleaning device, machine, apparatus, or system. Such a torque limiter would protect the flexible cable in the event that an operator equipped with a drill having a torque limiter setting, did not properly set the torque limiter on the drill prior to use.

The torque limiter couples the cable to the gearbox or power source. In certain embodiments, the torque limiter uses a ball type clutch system to provide an adjustable torque setting. One portion of the torque limiter is engaged to the output shaft of the gearbox/power source. Another portion of the torque limiter is engaged to the cable. The torque limiter includes a pocket or internal capture region for retaining a plurality of ball bearings or other spherical members. Preferred ball bearings are spring loaded and are configured to seat into a dimpled plate on structure to drive the cable.

As described herein, the torque limiter protects the cable from potential damage. The present subject matter also includes variant assemblies. A torque limiter with friction plates could be used in place of the previously noted ball type system. The torque limiter could also use a shear pin configuration, set to break at a predetermined torque value. In addition, the torque limiter could include a fixed torque setting that cannot be adjusted by the user.

Figure 14:
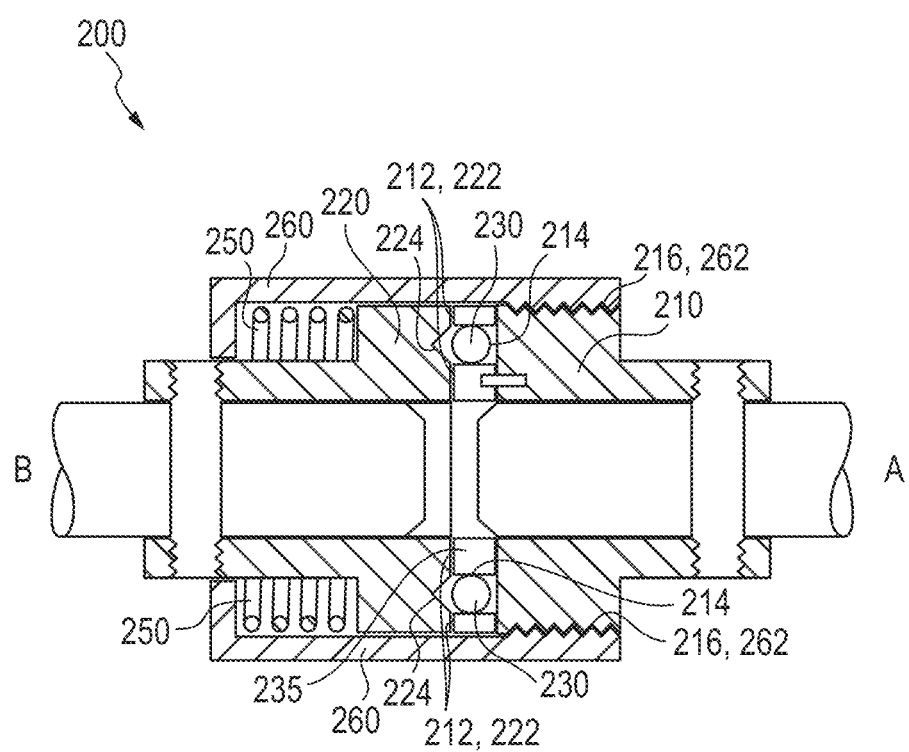
FIG. 14 is a partially-fragmented, schematic cross-sectional view, depicting one particular embodiment of a torque limiter in relation to the present subject matter.

FIG. 14 is a schematic cross sectional view of an embodiment of a torque limiter 200 in accordance with the present subject matter. The torque limiter 200 comprises a first rotatable member 210 engaged or engageable to a source of rotational power A, and a second rotatable member 220 engaged or engageable to a drain cleaning component, typically a drain cleaning cable denoted as B. The first member 210 and the second member 220 are positioned proximate to (i.e., near) one another. The torque limiter 200 also comprises at least one spherical member 230 disposed between the first and second members 210 and 220. Each of the first and second members define opposing faces. Specifically, the first member 210 defines a first face 212 directed toward the second member 220. Also, the second member 220 defines a second face 222 directed toward the first member 210. The number of spherical members 230 disposed between the first and second members may range from 1 up to about 50 or more. In other embodiments of the present subject matter, the number of spherical members could be within a range of from about 3 up to about 18. In some versions of the present subject matter, a cage plate 235 is disposed between the first and second members 210 and 220. In such versions, the spherical members 230 can be disposed in apertures or capture regions defined in the cage plate 235. In particular versions, the cage plate 235 is keyed or rotationally locked to the first member 210.

Typically, the first member 210 defines one or more capture regions 214 along the first face 212. Each capture region 214 is configured (e.g., sized and shaped) to retain a spherical member of predetermined radius positioned therein. Typically, the total number of capture regions 214 will correspond to the total number of associated spherical members 230 since, in many embodiments, a single spherical member 230 is disposed in an associated capture region 214. The capture regions 214 are thus sized and/or shaped so that, when a spherical member 230 is positioned therein, a portion of the member 230 extends above or beyond the first face 212 of the first member 210.

The second member 220 defines one or more recessed receiving regions 224 defined along the second face 222 of the second member 220, wherein each recessed receiving region 224 is sized and shaped to contact a spherical member 230 when positioned therein. As will be understood, on positioning and receipt of spherical members 230 in corresponding capture regions 214 of the first member 210 and in the recessed receiving regions 224 of the second member 220, causes torque limiter 200 to transfer torque and rotational power from power source A to the drain cleaning cable B.

The torque limiter 200 also comprises a biasing assembly configured to apply a compressive force between the first member 210 and the second member 220, and particularly between the first face 212 of the first member 210 and the second face 222 of the second member 220. Moreover, if a cage plate 235 is used, the biasing assembly applies a compressive force between the cage plate 235 and the first face 212 of the first member 210 and/or the second face 222 of the second member 220. The application of such a compressive force serves to promote and maintain contact between the first member 210, the spherical member(s) 230, the second member 220, and if used, the cage plate 235, thereby enabling torque transfer from the first member 210 to the second member 220. As will be understood, upon application of excessive torque to the first member 210, the spherical member(s) 230 are displaced from receipt and contact with the corresponding receiving region(s) 224 of the second member 220, thereby limiting transfer of excessive torque to the second member 220.

In many versions of the torque limiter 200, the biasing assembly includes a spring 250 or other biasing member configured and/or positioned to urge the second face 222 (of second member 220) and the first face 212 (of first member 210) together.

Also, in many versions of the torque limiter 200, the torque limiter includes an outer housing 260, wherein the first member 210, the second member 220, and the spherical member(s) 230 are all disposed within the outer housing 260. Also in many versions of the torque limiter 210, the first member 210 defines a threaded region 216, threadedly engaging a corresponding threaded region 262 defined in the outer housing 260. And in certain versions, the outer housing 260 is positioned and configured such that spring 250 is disposed between outer housing 260 and the second member 220.

In particular versions of the torque limiter 200, a predetermined maximum value, level or amount of torque transferred from first member 210 to second member 220 can be selectively varied. In such versions employing the (i) threaded engagement process between the outer housing 260 and the first member 210, and (ii) configuring the outer housing 260 so that the spring 250 is positioned between the outer housing 260 and the second member 220, a user can adjust the level of maximum torque by rotating the outer housing 260 relative to the first member 210. As will be understood, and as a result of the threaded engagement between the outer housing 260 and the first member 210, the extent of compression of the spring 250 can be varied, thereby changing the compressive force between the first and second members 210 and 220.

Figure 15:
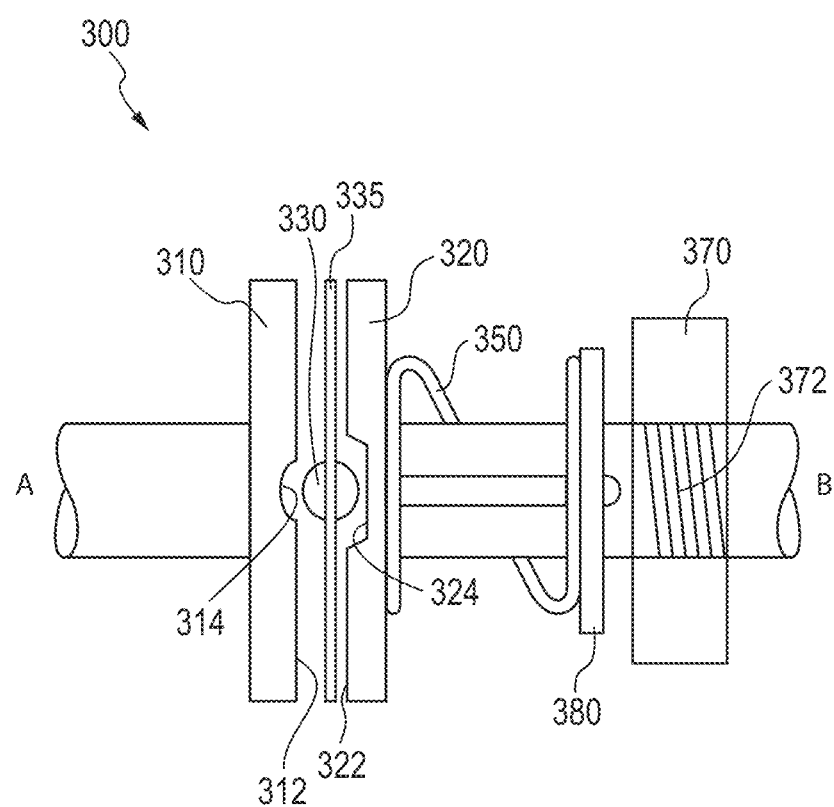
FIG. 15 is a partially-fragmented, schematic cross-sectional view, depicting another embodiment of a torque limiter in accordance with the present subject matter.

FIG. 15 is a schematic cross-sectional view of yet another embodiment of a torque limiter 300 in accordance with the present subject matter. The torque limiter 300 comprises a first rotatable member 310 engaged with, or engageable to, a source of rotational power A, and a second rotatable member 320 engaged with, or engageable to, a drain cleaning component, typically a drain cleaning cable denoted as B. The first member 310 and the second member 320 are positioned proximate (i.e., near to) one another. The torque limiter 300 also comprises at least one spherical member 330 and a cage plate 335 disposed between the first and second members 310 and 320. Each of the first and second members 310 and 320 define opposing faces. Specifically, the first member 310 defines a first face 312 directed toward the second member 320; and the second member 320 defines a second face 322 directed toward first member 310. It will be understood that the torque limiter 300 includes an assembly or provisions to promote engagement between the faces 312 and 322, so as to prevent separation of the first and second members 310 and 320.

The first member 310 defines one or more capture regions 314 along the first face 312. Each capture region 314 is configured (e.g., sized and shaped) to retain a spherical member positioned therein. Typically, the number of capture regions 314 correspond to the number of spherical members 330, since in many embodiments a single spherical member 330 is disposed in a corresponding capture region 314. The capture regions 314 are particularly sized and/or shaped such that upon a spherical member 330 positioned therein, a portion of the member 330 extends above or beyond the first face 312 of the first member 310.

The second member 320 defines one or more recessed receiving regions 324 defined along the second face 322 of second member 320, wherein each recessed receiving region 324 is configured (e.g., sized and shaped) to contact an associated spherical member 330 positioned therein.

The torque limiter 300 also comprises a cage plate 335 disposed between the first and second members 310 and 320, and particularly between associated faces 312 and 322 of the first and second members 310 and 320. The cage plate 335 itself defines one or more apertures which are typically circular in shape and typically sized to receive a corresponding spherical member positioned therein. The torque limiter 300 also comprises a biasing assembly configured to apply a compressive force between the first and second members 310 and 320, and particularly between the first face 312 of the member 310 and the second face 322 of second member 320. The application of such force serves to promote and maintain contact between the first member 310, the spherical member(s) 330, and the second member 320, and thereby to transfer torque from the first member 310 to the second member 320. As will be understood, upon application of excessive torque to the first member 310, the spherical member(s) 330 are displaced from contact with the corresponding receiving region(s) 324 of the second member 320, thereby limiting transfer of excessive torque to the second member 320.

In many versions of the torque limiter 300, the biasing assembly includes a spring 350 or other biasing member configured and/or positioned to urge the second face 322 (of second member 320) and the first face 312 (of first member 310) together.

In particular versions of the torque limiter 300, a predetermined maximum value, level or amount of torque transferred from the first member 310 to the second member 320 can be selectively varied. For example, in the version depicted in FIG. 15, the torque limiter 300 includes an adjusting nut 370 threadedly engaged with the second member 320 at a threaded region 372. The torque limiter 300 can also include a floating shoulder 380 disposed between the spring 350 and the adjusting nut 370. As will be understood, upon rotation of the adjusting nut 370, the nut 370 is linearly displaced along the second member 320 in a direction either towards or away from the spring 350. Upon contact between the nut 370, the shoulder 380, and the spring 350, movement of the nut 370 toward the spring 350 increases the compressive force upon (i) the cage plate 335 and/or the spherical member(s) 330, and (ii) the first member 310. Movement of the nut 370 away from the spring 350 reduces the compressive force.

Torque Controlled Retrievable Chain Knockers

The present subject matter also provides torque controlled retrievable drain cleaning tools such as, e.g., chain knockers. This aspect of the present subject matter is in response to a problem involving retrieval of a chain knocker or other drain cleaning tool that is lost within a pipe or conduit due to over torqueing and snapping off or otherwise severing from a flexible cable as a result of contact of the chain knocker or other drain cleaning tool with, or by, an unmovable obstruction. The present subject matter assemblies limit the amount of torque that a user can apply to a chain knocker or other such tool and therefore prevent the flexible cable or system from being damaged.

The following aspect of the present subject matter addresses several problems. In the event a particular chain knocker cannot overcome an obstruction, a shear component such as a shear pin will snap, thus automatically stopping the chain knocker from rotating, for preventing damage to the flexible cable or other component of a drain cleaning device, machine, apparatus and/or system. By controlling the torque thusly, either with a shear pin or a clutch, e.g., a user avoids potentially losing the chain knocker in a sewer, drain pipe, underground pipeline, or other such construct. As those skilled in the art of drain cleaning are aware, retrieving a lost or damaged chain knocker is frequently very difficult and often impossible. Yet, various assemblies disclosed and described herein advantageously prevent users from becoming entangled with flexible cable in the event that their flexible cable experiences a sudden release of torque.

More specifically, one method of cleaning drains is by the use of flexible cable described herein, connected to a chain knocker which, in turn, is powered by an external power source, such as, e.g., either a handheld corded or battery-powered drill. Thus, another aspect of the present subject matter is providing a separate attachment from the chain knocker to the flexible cable and allowing a controlled disengagement of the chain knocker in the event the chain knocker meets an obstruction. A conventional method disclosed in the prior art makes no provision for controlling torque. Moreover, such conventional method has the potential of causing damage to one or more components of a drain cleaning device, machine, apparatus and/or system that uses flexible cable. However, with the disclosure of the present subject matter, a preferred method of controlling the torque is using a preset controlled shear pin that snaps when exceeding a predetermined torque value of load, thereby effectively disengaging the chain knocker. The user can then remove the flexible cable and the special tool (e.g., chain knocker tool mentioned) from the drain; reinstall a new shear pin; re-introduce the flexible cable and chain knocker (re-engaged on an end portion of flexible cable), into the drain line, pipeline, or sewer; thereby continuing desired drain cleaning operations.

Figure 16:
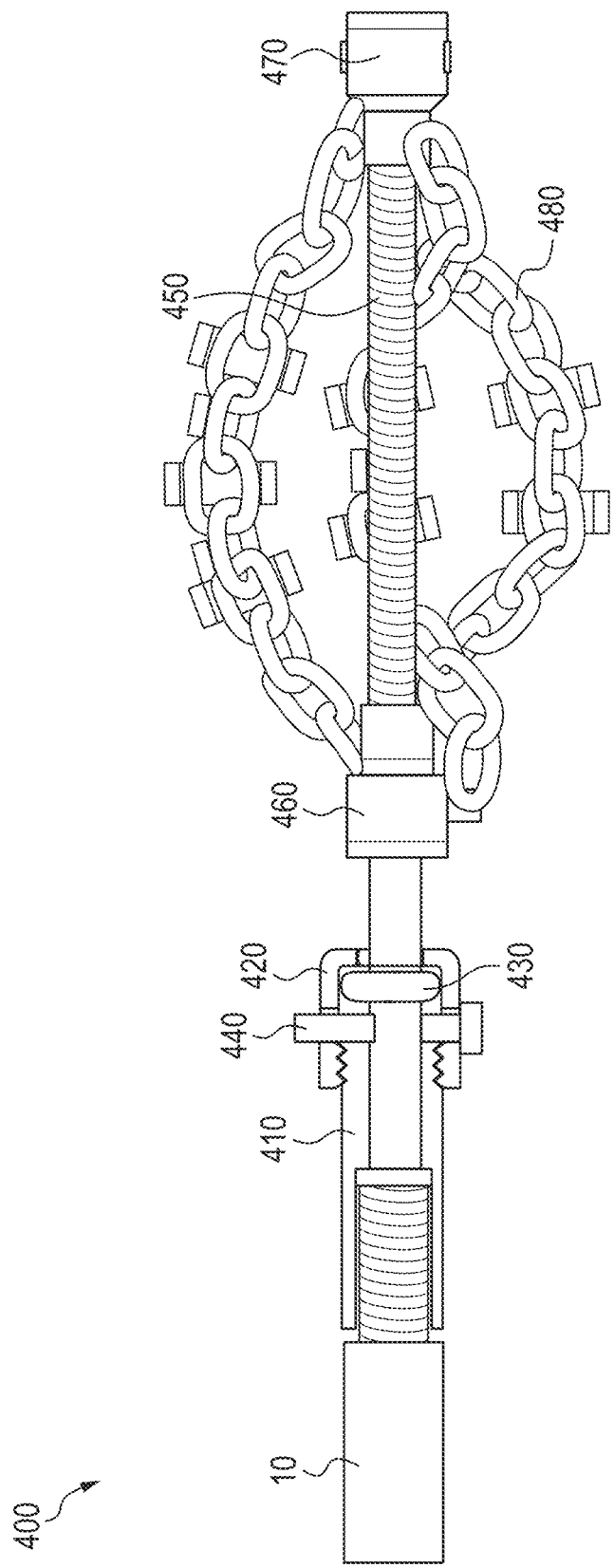
FIGS. 16, 17 are schematic views of an embodiment of a retrievable chain knocker for attachment to an end portion of flexible cable for the present subject matter.
Figure 17:
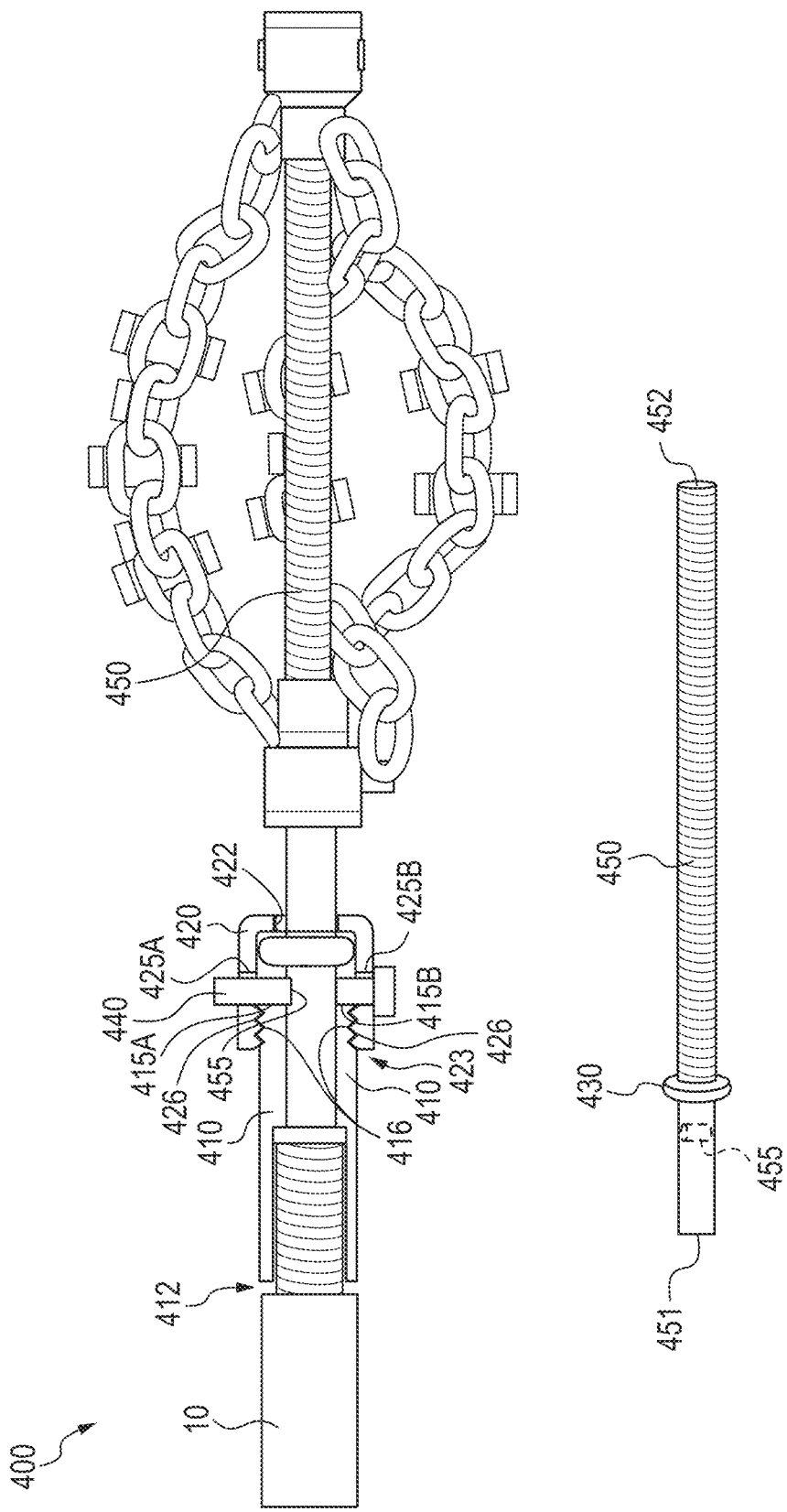
Figure 18:
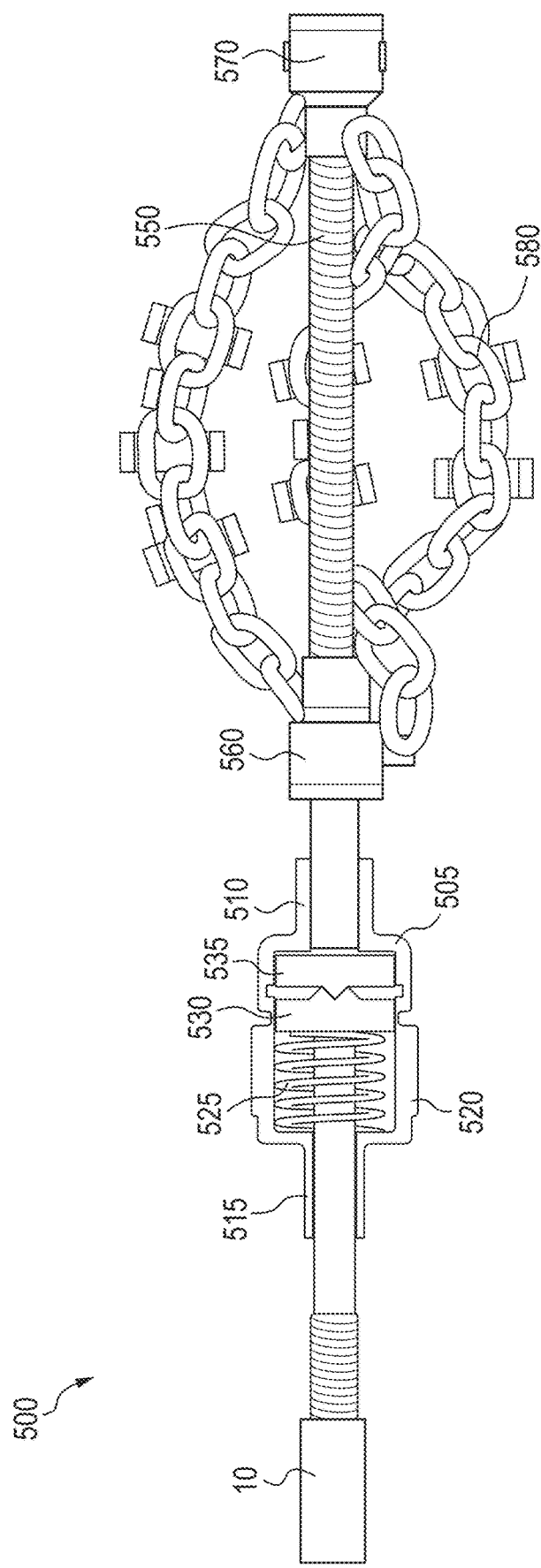
FIGS. 18, 19 are schematic views of another embodiment of a retrievable chain knocker for attachment to an end portion of cable for the present subject matter.
Figure 19:
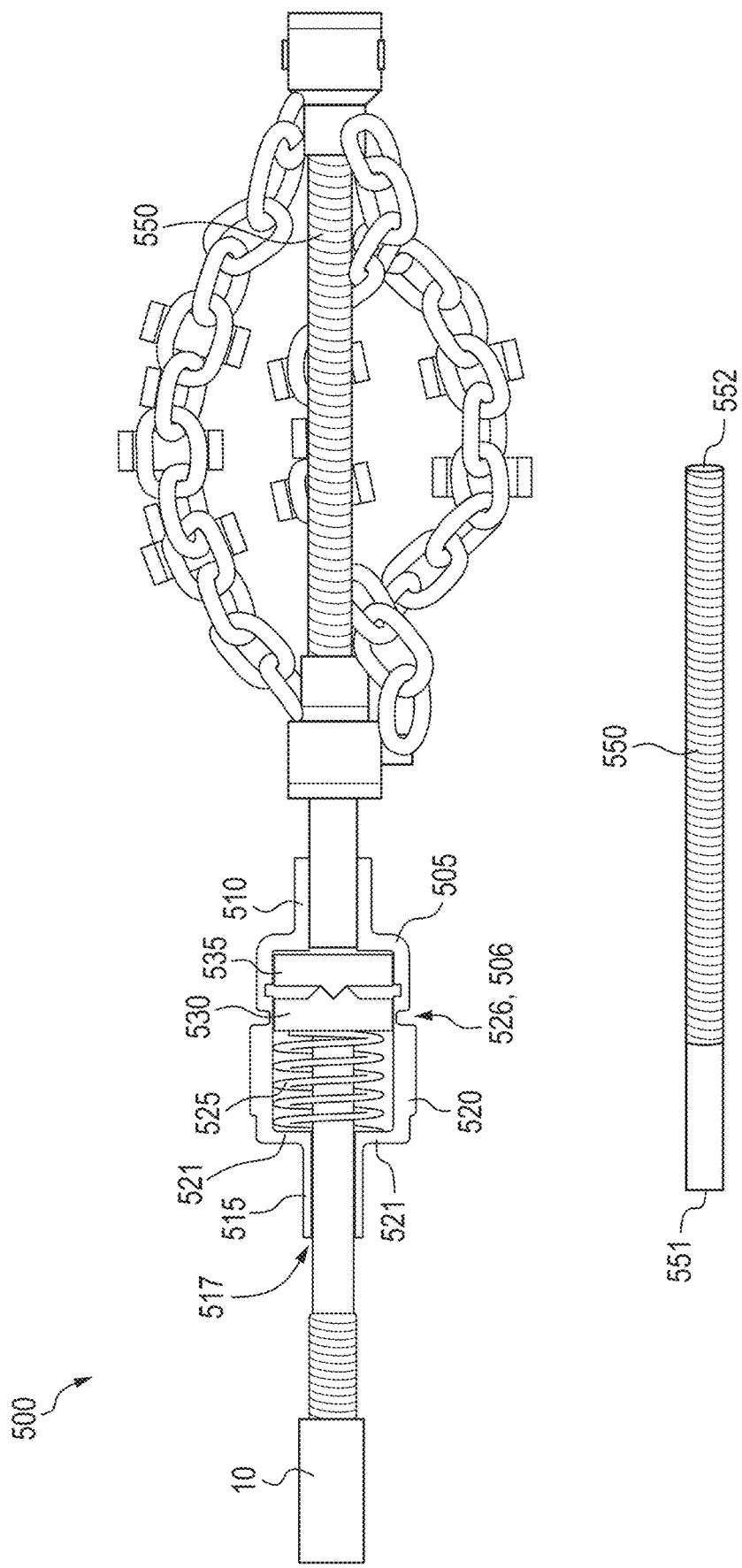

FIGS. 16 and 17 illustrate an embodiment of a torque controlled retrievable chain knocker tool in accordance with the present subject matter. The embodiment depicted in FIGS. 16 and 17 uses a shear pin assembly as described herein. FIGS. 18 and 19 illustrate another embodiment of a torque controlled retrievable chain knocker tool in accordance with the present subject matter. The embodiment shown in FIGS. 18 and 19 uses a clutch assembly as described herein.

FIGS. 16 and 17 schematically illustrate an embodiment of a torque controlled retrievable chain knocker tool in accordance with the present subject matter. FIG. 17 illustrates additional details of the tool and shows a spindle component in isolation. These figures depict a chain knocker 400 assembly engaged to an end of a flexible cable 10. The chain knocker 400 comprises a retaining lug 410, a lug retaining cap 420, a spindle 450, a retaining ring 430 disposed on the spindle 450, and a shear pin 440. It will be understood that the spindle 450 may be a cable section or other flexible components. A wide array of retaining components could potentially be used instead of or in addition to the retaining ring 430.

The retaining lug 410 is configured (e.g., sized and shaped), to receive an end portion of a predetermined length of flexible cable 10, typically used in connection a drain cleaning device, machine, apparatus and/or system. The retaining lug 410 is typically cylindrical and defines a receiving region 412 for receiving and accommodating the flexible cable 10. The retaining lug 410 defines a threaded engagement region 416 defined along its outer periphery. The retaining lug 410 also defines a pair of aligned apertures 415A and 415B sized and shaped to receive the shear pin 440.

The lug retaining cap 420, also typically cylindrical in shape, defines a central aperture 422 sized to receive and accommodate spindle 450. The lug retaining cap 420 also defines an open end 423, configured (e.g., sized and shaped), to receive the retaining lug 410. The lug retaining cap 420 also defines a pair of aligned apertures 425A and 425B sized and shaped to receive the shear pin 440. The lug retaining cap 420 also defines a threaded engagement region 426 along its inner surface. The threaded engagement region 426 of the lug retaining cap 420 is configured to threadedly engage the threaded engagement region 416 of the retaining lug 410.

The retrievable chain knocker tool 400 also comprises a spindle 450, cable section, or other flexible component, having a proximal end 451 and an opposite distal end 452. Spindle 450 defines an aperture 455 extending through spindle 450.

Upon assembly, the spindle 450 is at least partially disposed in the retaining lug 410 such that the aperture 455 defined in the spindle 450 is aligned with the pair of aligned apertures 415A, 4156 of the retaining lug 410; and the retaining lug 410 is threadedly engaged with the lug retaining cap 420 via the threaded engagement regions 416 and 426 of the retaining lug 410 and the lug retaining cap 420, respectively. In addition, the pair of aligned apertures 425A and 425B of the lug retaining cap 420 are aligned with the aligned apertures 415A and 415B defined in the retaining lug 410 and also aligned with the aperture 455 defined in the spindle 450. The shear pin 440 is disposed in the noted apertures 415A, 415B, 425A, 425B, and 455.

In many embodiments, the chain knocker tool 400 also comprises a retaining ring 430 disposed about a region on the spindle 450. Upon assembly, the retaining ring 430 is positioned or formed about the spindle 450 and captured between the shear pin 440 extending through the apertures 415A, 415B, 425A, 425B, and 455 and the lug retaining cap 420.

The chain knocker tool 400 also comprises a distal chain retention member 470 and a proximal chain retention member 460. The chain retention members 460, 470 are disposed on and engaged with the spindle 450. Typically, the distal chain retention member 470 is disposed at or near a distal end 452 of the spindle. And the proximal chain retention member 460 is disposed between the distal chain retention member 470 and a proximal end 451 of the spindle 450. One or more chain section(s) 480 extend between the distal chain retention member 470 and the proximal chain retention member 460.

FIGS. 18 and 19 illustrate another embodiment of a torque controlled retrievable chain knocker pursuant to the present subject matter. The embodiment illustrated in FIGS. 18 and 19 uses a clutch assembly, described herein. FIG. 19 shows additional details of the chain knocker and illustrates a spindle component in isolation. The figures show a chain knocker 500 assembly engaged to an end of a flexible cable 10. Chain knocker 500 comprises a retaining cap 505, a distal retaining lug 510, a proximal retaining lug 515, an adjusting spring retaining nut 520, a spring 525, a proximal ratchet member 530, a distal ratchet member 535, and a spindle 550.

The proximal retaining lug 515 is configured (e.g., sized and shaped), to receive an end of a drain cleaning cable and particularly flexible cable 10. Typically, the retaining lug 515 is cylindrical in shape and defines a receiving region 517 for receiving and accommodating the flexible cable 10.

The adjustable spring retaining nut 520 includes a plate or transverse annular wall 521 for supporting the spring 525 and a threaded engagement region 526. The threaded engagement region 526 of retaining nut 520 is threadedly engaged with a corresponding threaded engagement region 506 of the retaining cap 505. Thus, as will be understood, the force of spring 525 exerted on ratchet members 530, 535 can be adjusted by rotating retaining nut 520 relative to the retaining cap 505. The adjustable spring retaining nut 520 can be provided in a variety of different forms. However, that retaining nut 520 typically in conjunction with the plate 521 and the proximal ratchet member 530, defines a hollow interior region within which the spring 525 is disposed.

The proximal ratchet member 530 is positioned to engage and transfer rotational power from the flexible cable 10 to the distal ratchet member 535. The distal ratchet member 535 is engaged or otherwise coupled to the spindle 550. The distal retaining lug 510 receives at least a portion of the spindle 550. The engagement faces of the proximal ratchet member 530 and the distal ratchet member 535 can be configured to promote transfer of rotational power between the ratchet members 530, 535. For example, the faces can include various steps, projections, and/or friction promoting agents. The retaining cap 505 generally encloses the distal ratchet member 535. The retaining cap 505 can also receive a portion of the spindle 500.

Although the various components of the chain knocker tool 500 and particularly the proximal retaining lug 515, the adjusting spring retaining nut 520, the retaining cap 505, and the distal retaining lug 510, are described as separate components, it will be understood that one or more of these may be integrated or combined with other components of the chain knocker tool 500.

The chain knocker tool 500 also comprises a distal chain retention member 570 and a proximal chain retention member 560. The chain retention members 560, 570 are disposed on and engaged with the spindle 550. Typically, the distal chain retention member 570 is disposed at or near a distal end 552 of the spindle. And the proximal chain retention member 560 is disposed between the distal chain retention member 570 and a proximal end 551 of the spindle 550. One or more chain section(s) 580 extend between the distal chain retention member 570 and the proximal chain retention member 560.

Figure 20:
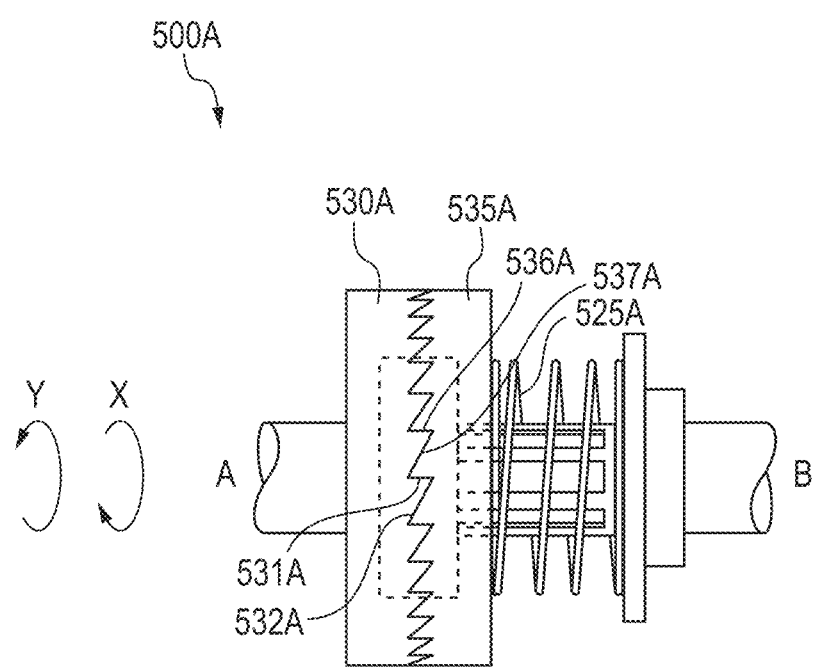
FIG. 20 is a schematic illustration of a one-way clutch assembly.

FIG. 20 illustrates a clutch assembly 500A used in another embodiment of a torque controlled retrievable drain cleaning tool and particularly a chain knocker tool. In this version, the clutch assembly is configured as a one-way clutch that transmits rotational power in only a single rotational direction. Alternatively, the clutch assembly is configured to enable adjustment of a maximum torque in one rotational direction. For example, the clutch assembly 500A includes a proximal ratchet member 530A and a distal ratchet member 535A. The clutch assembly 500A transfers rotational power from a source of such power A, to a rotatable member such as a drain cleaning cable or tool denoted as B. The proximal ratchet member 530A defines a plurality of angled teeth each having a transverse face 531A and a sloped face 532A. Similarly, the distal ratchet member 535A defines a plurality of angled teeth each having a transverse face 536A and a sloped face 537A. The proximal ratchet member 530A and the distal ratchet member 535A are engaged together such that the transverse faces 531A of the angled teeth of the proximal ratchet member 530A contact the transverse faces 536A of the angled teeth of the distal ratchet member 535A. And, the sloped faces 532A of the angled teeth of proximal ratchet member 530A contact the sloped faces 537A of the angled teeth of the distal ratchet member 535A.

The clutch assembly 500A also may comprise a spring or biasing member 525A for applying a compressive force between the ratchet members 530A, 535A and particularly their contacting faces.

Upon rotation of member A in the direction of arrow Y, torque is transferred to member B as a result of contact between transverse faces 531A and 536A. Upon rotation of member A in the direction of arrow X, torque is transferred to member B as a result of contact between sloped faces 532A and 537A. As will be understood, if the spring 525A exerts a sufficiently high compressive force such that no or negligible slippage occurs between the sloped faces 532A and 537A, torque is transferred from member A to member B. However, if the spring 525A exerts a relatively low compressive force such that excessive slippage occurs between the sloped faces 532A and 537A, torque is not transferred or only partially transferred and at low torque levels, from member A to member B.

It is also contemplated that the clutch assembly 500A could be used in applications otherwise associated with the torque limiters illustrated and described in FIGS. 14 and 15.

The torque controlled retrievable chain knockers prevent flexible cable from being damaged or entangling the user in the event the chain knocker is overstressed due to an obstruction encountered in a drain pipe or other region. If the replaceable shear pin is broken, the chain knocker is captured by the retaining cap, which allows the user to remove the chain knocker along with the flexible cable. The user can reinstall the shear pin and re-engage the assembly in the drain cleaning activity. A torque controlled chain knocker can be used should the user inadvertently use a corded power drill that otherwise might damage the drain cleaning device, machine, apparatus, and/or system, or flexible cable due to overstressing the cable due to the higher rotational speeds and/or higher levels of torque associated with a corded or battery-powered handheld drill.

An alternative to the noted assemblies described herein, is to use a spring loaded clutch plate, similar to the assembly depicted in FIG. 20, except that under tension the clutch will work in both directions and the tension can be controlled by the user via an adjustment nut or similar component(s).

Although chain knockers have been described as examples of the torque controlled retrievable tools, it will be understood that the present subject matter is not limited to chain knockers and instead includes a wide array of tools, accessories, and components for use with a drain cleaning cable and particularly flexible drain cleaning cable as described herein.

Clutch Assemblies

The present subject matter is also directed to various devices, machines, apparatuses, and/or systems which are used for cleaning sewers, drain lines, pipelines, and various other constructs, underground or through a wall, and which employ various clutch assemblies. Generally, drain cleaning apparatuses are provided that comprise a drum housing defining an interior region, a cable carrier rotatably mounted within the interior region of the drum housing, and a clutch assembly. The clutch assembly is typically mounted on the cable carrier and includes a primary clutch member for engagement to a rotary power source and a secondary clutch member for delivering rotary power to a drain cleaning cable, and particularly to a drain cleaning cable end located within the interior region of the cable carrier.

Figure 21:
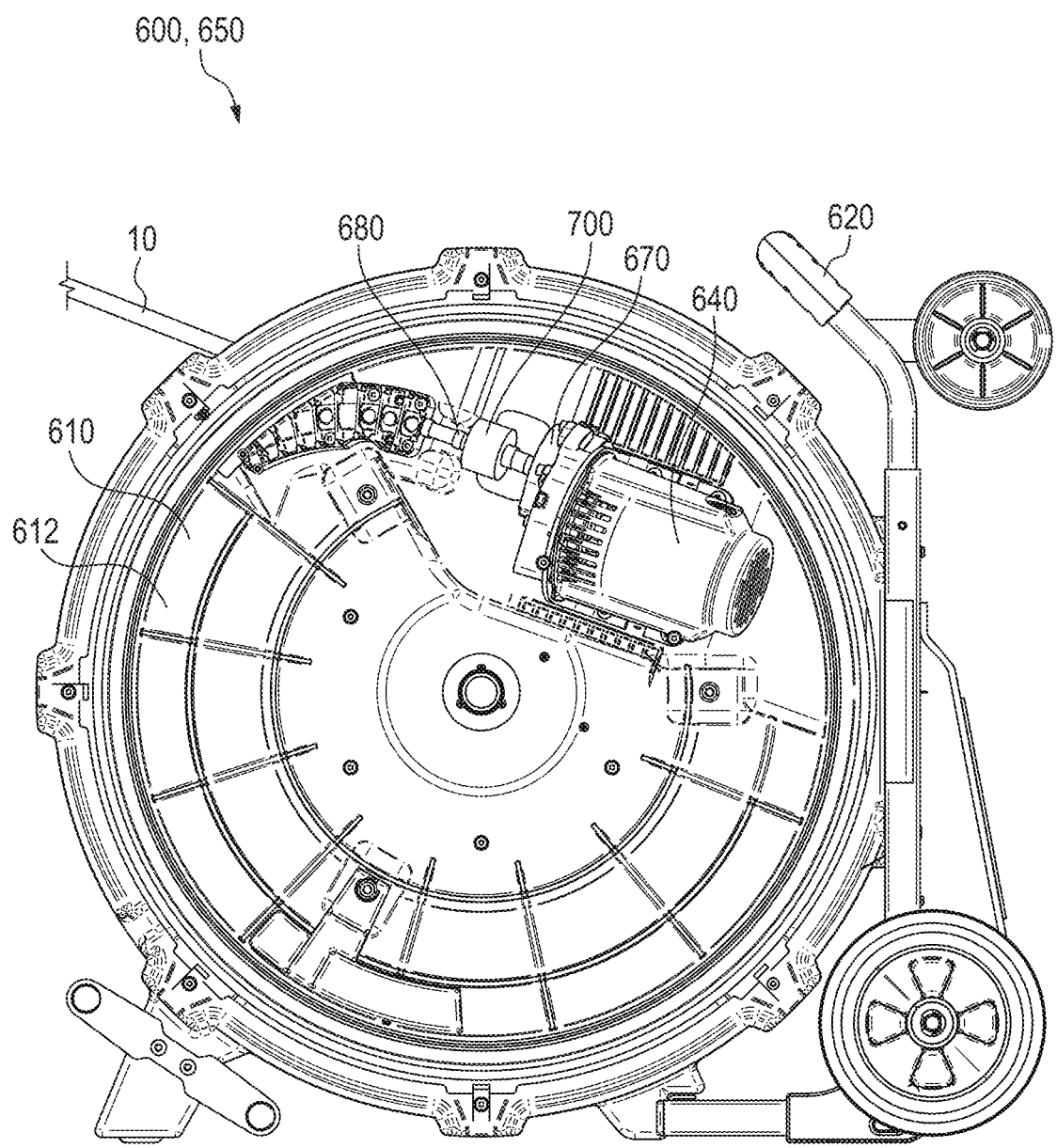
FIG. 21 is a schematic of an embodiment of a drain cleaning machine, apparatus and/or system including a clutch assembly for the present subject matter.
Figure 22:
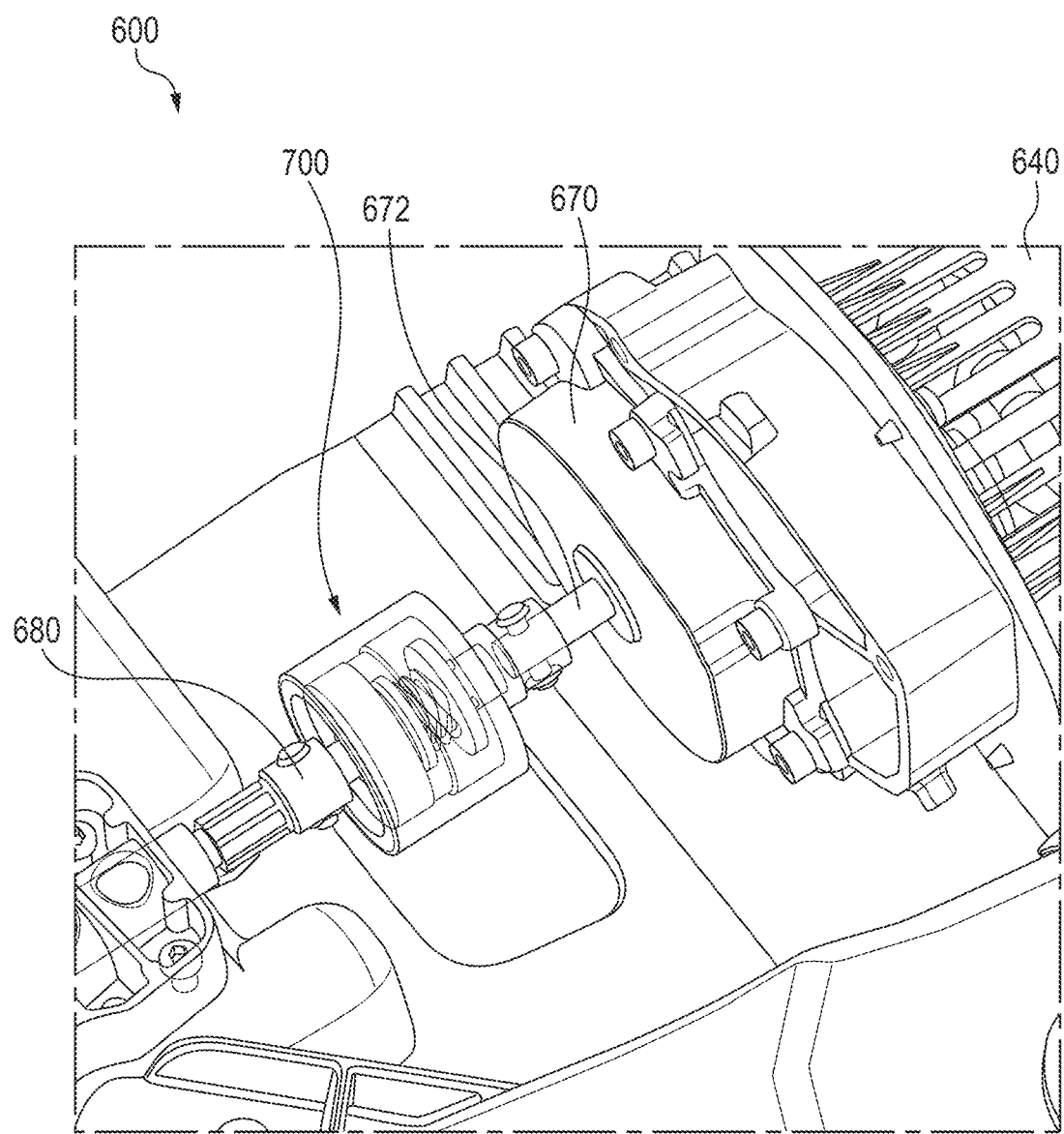
FIG. 22 is a schematic view of the clutch assembly depicted in FIG. 21.
Figure 23:
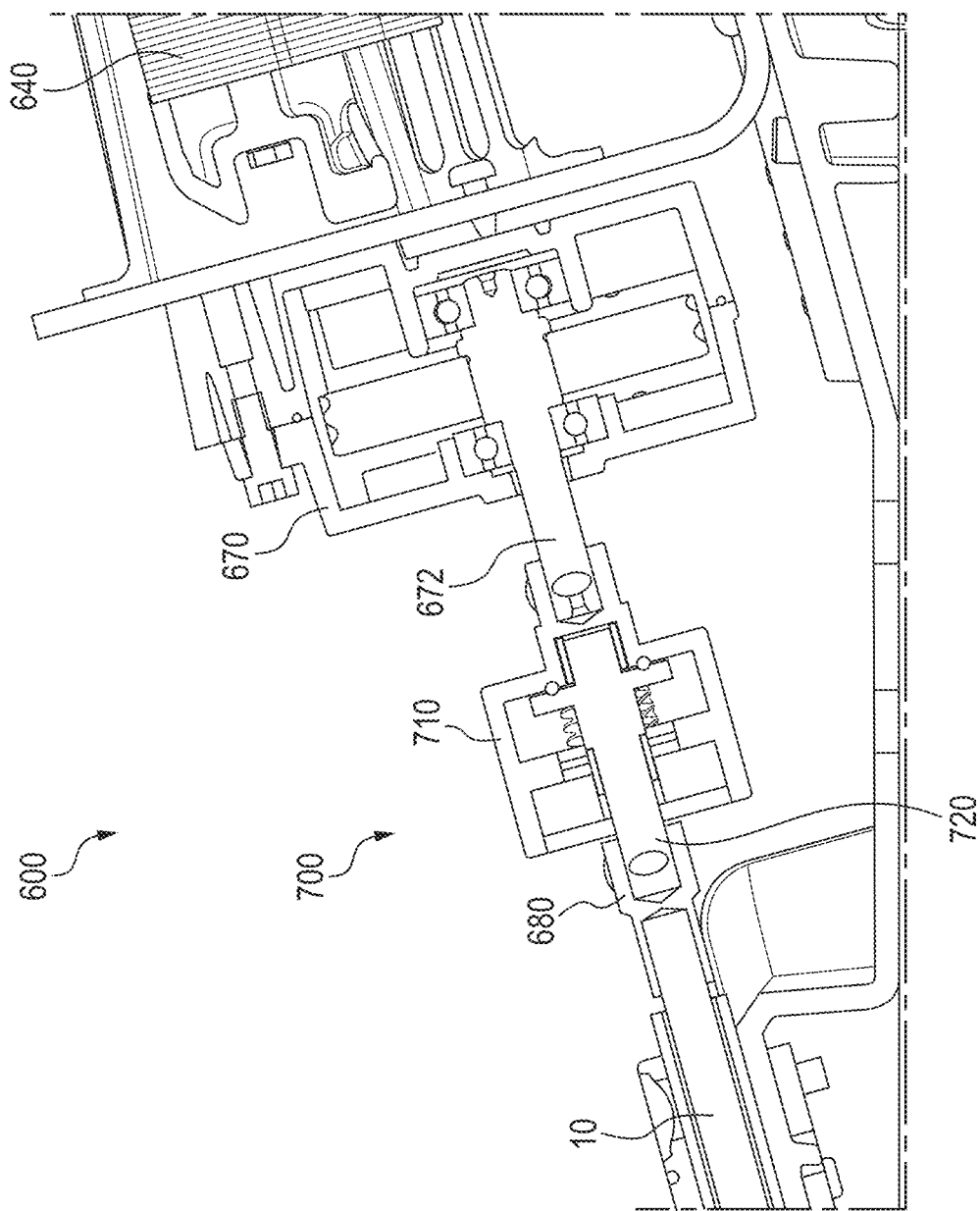
FIG. 23 is a cross-sectional view of the clutch assembly shown in FIG. 22.

FIGS. 21-23 illustrate a drain cleaning apparatus 600 comprising a drum housing 650 generally enclosing a rotatable cable carrier 610, an electric motor 640, a transmission 670, and a coupling 680. These components are as previously described herein. The drain cleaning apparatus 600 also comprises a clutch assembly 700. The electric motor 640 and transmission 670 are typically mounted or otherwise secured to a rear wall 612 of the cable carrier 610. The clutch assembly 700 transfers rotational power from the motor 640 and transmission 670 to the coupling 680 for ultimate delivery to a flexible cable 10. FIG. 21 illustrates the drum housing 650 releasably engaged or attached to an optional wheeled cart 620 for facilitating transport of the drum housing 650 and components therein to a job site for example. It will be appreciated that a drain cleaning apparatus powered by an external power source such as an electrically powered drill, could also be utilized. FIGS. 22-23 illustrate additional details of the clutch assembly 700. The clutch assembly 700 transfers rotational power from a transmission shaft 672 of the transmission 670 and transfers such rotational power to the coupling 680. Therefore, the clutch assembly 700 is typically positioned and/or located between the transmission 670 and the coupling 680.

Referring to FIG. 23, the clutch assembly 700 comprises a primary clutch member 710 and a secondary clutch member 720. The primary clutch member 710 is engaged or otherwise coupled to the flexible cable and chain knocker (re-engaged on an end portion of flexible cable), into the drain line, pipeline, or sewer; thereby continuing desired drain cleaning operations.

Figure 24:
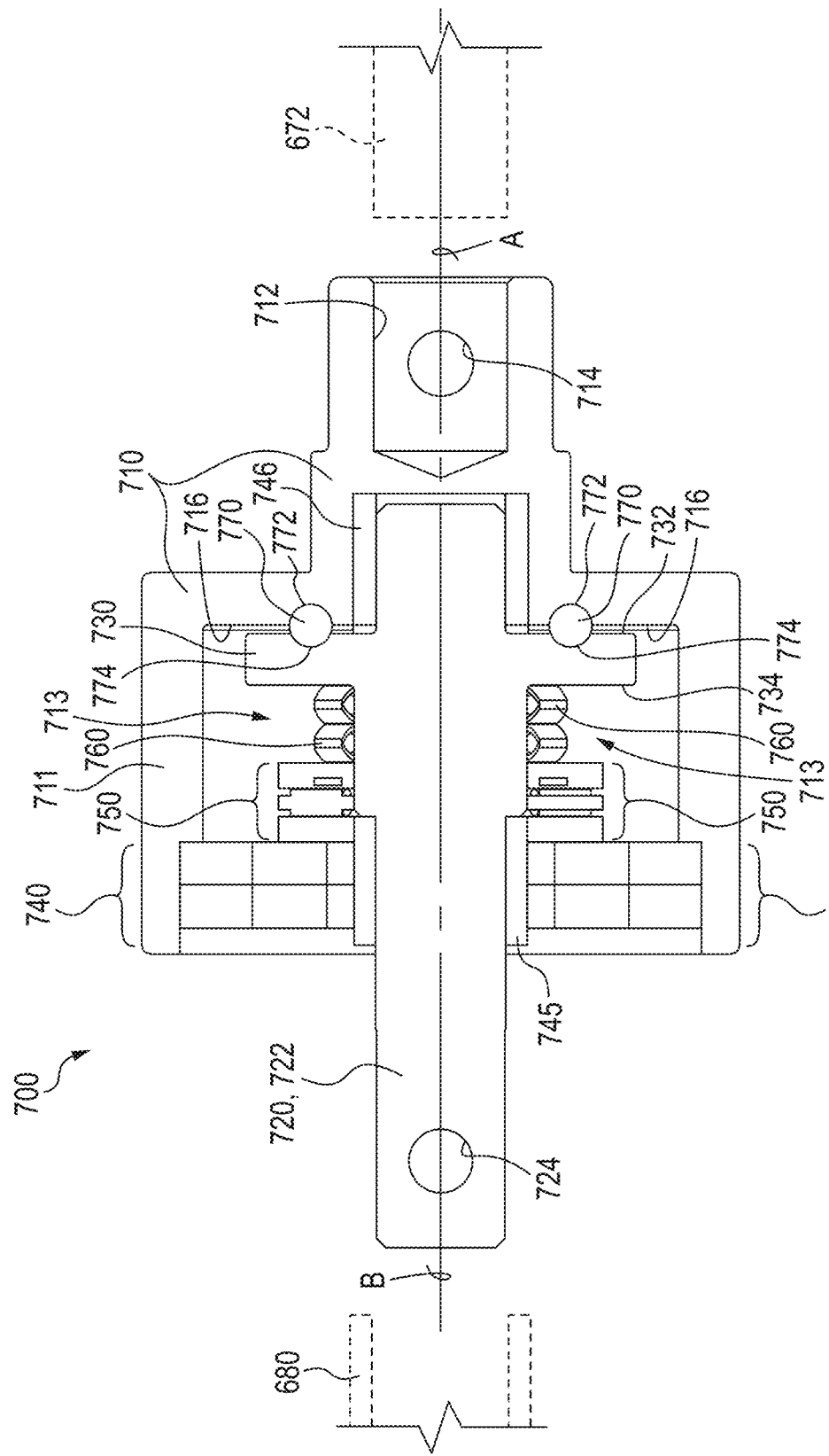
FIG. 24 is also a cross-sectional view of the assembly shown in FIGS. 22,23.
Figure 25:
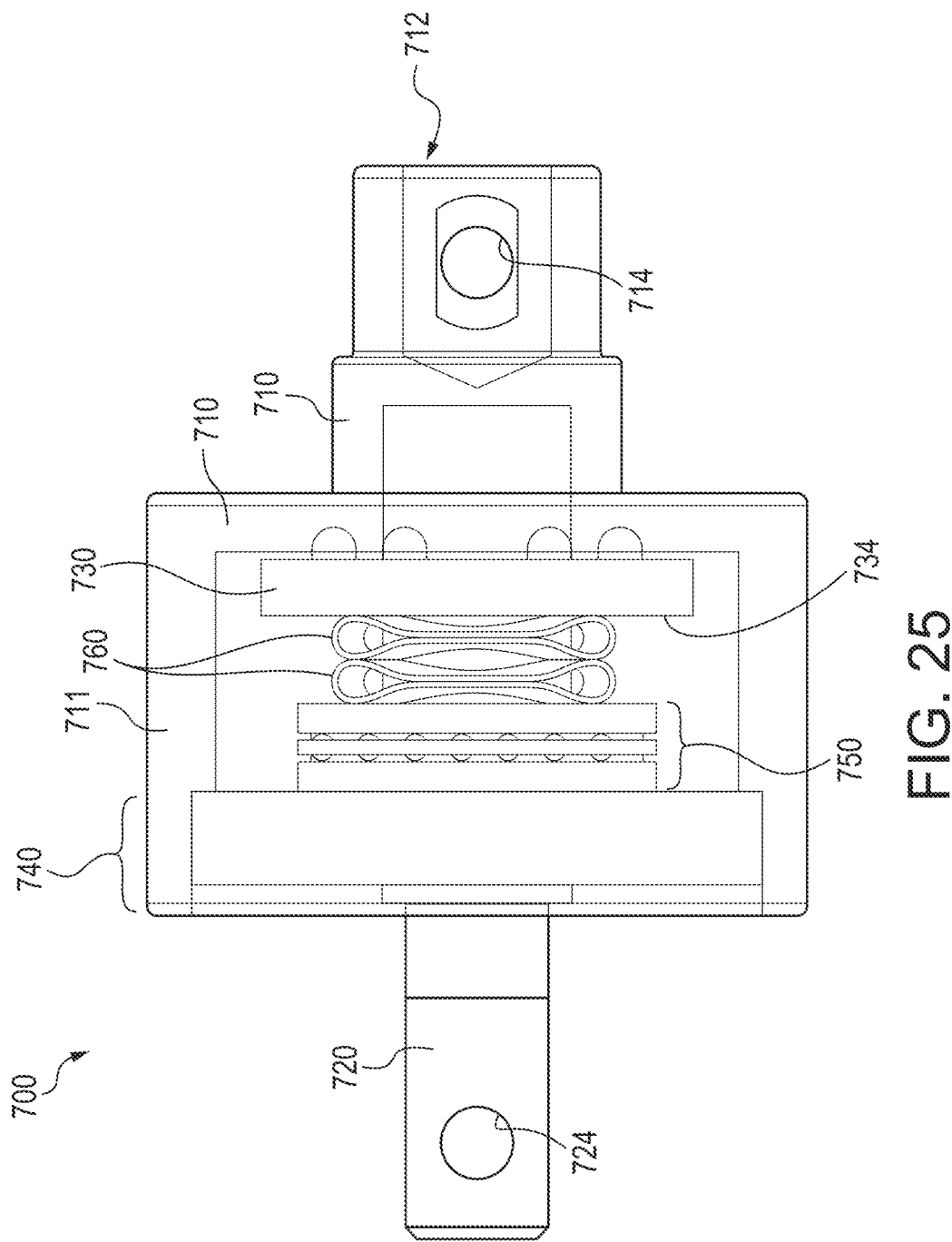
FIG. 25 is another schematic view of the assembly shown in FIGS. 22-24.
Figure 26:
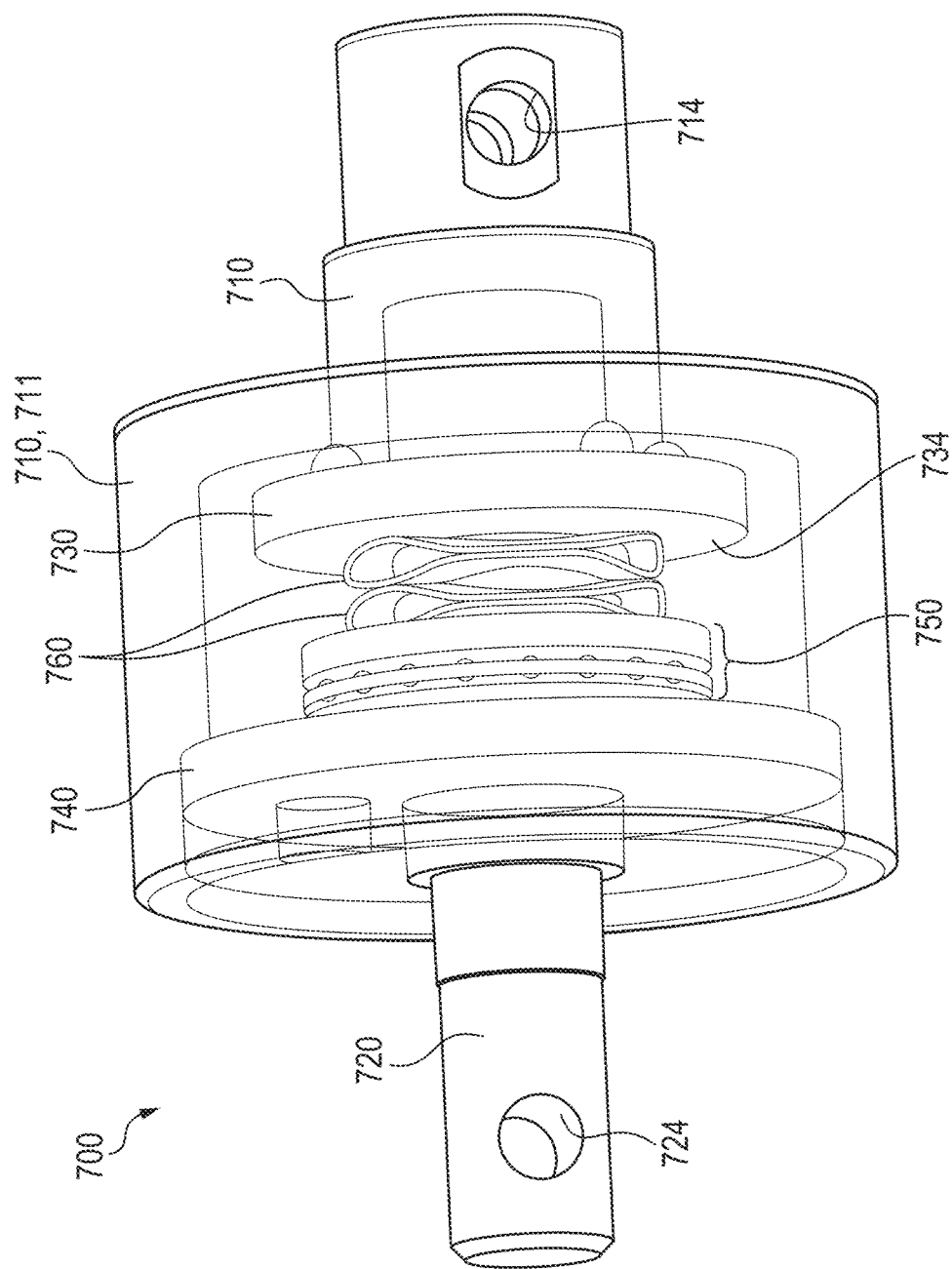
FIG. 26 is a perspective view of the clutch assembly shown in FIGS. 22-25.

FIGS. 24-26 illustrate additional details of the clutch assembly 700. As shown in FIG. 24, the primary clutch member 710 defines a receiving region 712 adapted for receipt and/or engagement with a source of rotary power such as for example the transmission shaft 672. The primary clutch member 710 may include one or more apertures 714 for receiving a pin (not shown) or other component to promote coupling to the source of rotary power. The secondary clutch member 720 includes a shaft portion 722 extending from the clutch assembly 700 for engagement to the coupling 680 or ultimately to the end of the flexible cable. The shaft portion 722 may include one or more apertures 724 for receiving a pin (not shown) or other component to promote coupling to the source of rotary power. The primary clutch member 710 rotates about an axis of rotation A, and the secondary clutch member 720 rotates about an axis of rotation B. In the assembled clutch assembly 700, the axes A and B coincide and are colinear with each other. The secondary clutch member 720 includes a radial flange 730 which typically extends transverse to the axis B. The radial flange 730 defines an engagement face 732 and an oppositely directed push face 734. The primary clutch member 710 also defines an engagement face 716. The primary clutch member 710 includes an outer circumferential member 711 that receives or is otherwise secured to an annular wall 740. In many versions, the outer circumferential member 711 and the annular wall 740 each includes threaded regions that enable threaded engagement between the member 711 and the annular wall 740. In addition, the provisions of such threaded regions in association with the member 711 and the annular wall 740 enables adjustment of the clutch assembly 700. The annular wall 740 together with the outer circumferential member 711 define an enclosed interior region 713. The annular wall 740 rotates with the primary clutch member 710 and is rotatably supported on or about the secondary clutch member 720 by one or more bushing(s) 745 and/or 746. Disposed within the interior region 713 and between the annular wall 740 and the radial flange 730 is at least one biasing member 760. As explained in greater detail herein, the biasing member(s) applies a force upon the radial flange 730 and particularly a compressive force between the engagement face 732 of the flange 730 and the opposing engagement face 716 of the primary clutch member 710. As will be appreciated, application of such force promotes engagement between the primary and secondary clutch members 710, 720 and thus promotes transfer of rotational power between these members. Typically, the primary clutch member 710 and the radial flange 730 are arranged such that their engagement faces 716, 732 respectively, are at least in partial contact with each other. The clutch assembly 700 can in certain versions also include a thrust bearing assembly 750 which is typically seated against the biasing member(s) 760. In many versions of the clutch assembly 700, at least one or more of the radial flange 730, the thrust bearing assembly 750, and the biasing member(s) 760 are disposed in the enclosed interior region 713.

Referring further to FIGS. 24-26, in particular versions of the clutch assembly 700, one or more torque-transfer members 770 which can for example be in the form of spheres or spherical member(s), are positioned between the engagement face 716 of the primary clutch member 710, and the engagement face 732 of the radial flange 730 of the secondary clutch member 720. Typically, one or more recess (es) 772 are defined in the engagement face 716 for receipt and engagement with a torque transfer member 770. And, one or more recess(es) 774 are defined in the engagement face 732 for receipt and engagement with a corresponding torque transfer member 770. Generally, the recess(es) 772 and 774 are sized and shaped to fittingly receive and engage the torque-transfer members 770. For an assembly utilizing torque-transfer members 770 in the form of spheres, the recesses 772 and 774 are preferably in the form of hemispheres or substantially so.

Figure 27:
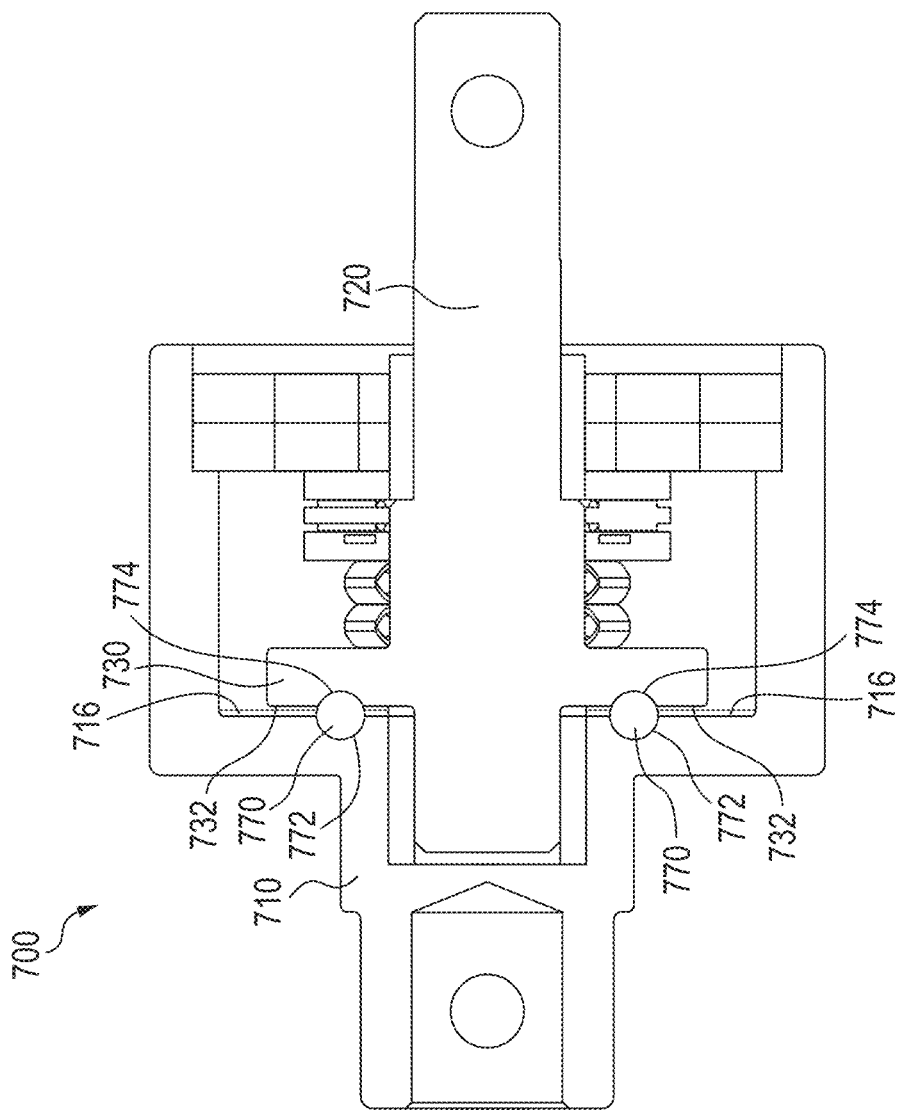
FIG. 27 is another detailed schematic view of the clutch assembly, shown in FIGS. 21-26, illustrating partial seating and full seating for certain spherical members.

FIG. 27 illustrates another aspect that may be implemented in the various clutch assemblies such as for example the previously described clutch assembly 700. One of the engagement faces that receive and contact a spherical torque-transfer member 770, such as recess 772 contacts 180° of the spherical member 770, and the corresponding recess 774 contacts less than 180° of the spherical member such as about 160° to 179°, more particularly from about 165° to 179°, and in particular versions from 168° to 179°. Although recess 772 defined in the primary clutch member 710 is shown as the 180° contact region and recess 774 of the secondary clutch member 720 is shown as the sub-180° contact region, the present subject matter includes reversal of these regions, i.e., recess 772 being the sub-180° contact region and the recess 774 being the 180° contact region.

Figure 28:
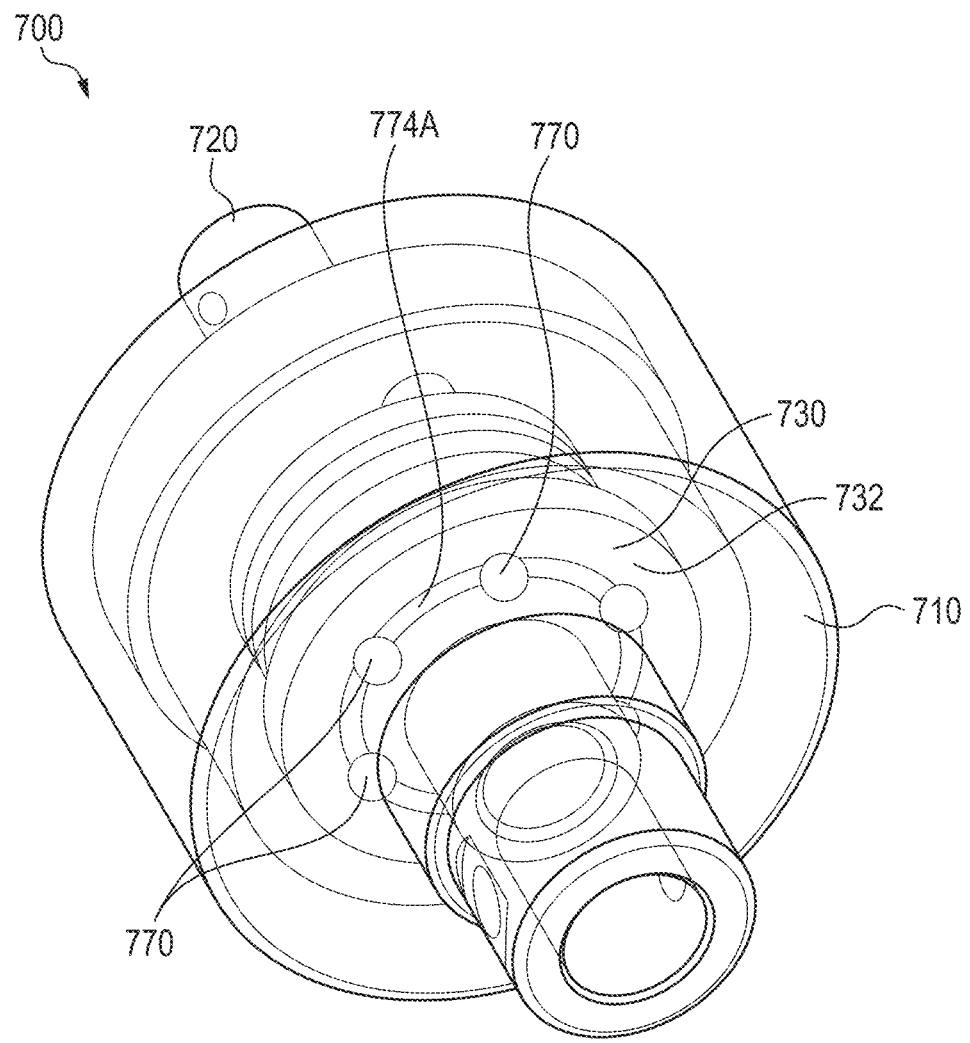
FIG. 28 is a perspective view of the clutch assembly, shown in FIGS. 21-26, depicting a grooved track for a clutch assembly in relation to the present subject matter.

FIG. 28 illustrates yet another aspect that may be incorporated in the various clutch assemblies such as for example the previously described clutch assembly 700. In this embodiment, the radial flange 730 defines a recessed track 774A which is provided along the engagement face 732 of the radial flange 730. The recessed track 774A is sized and shaped to receive one or more of the torque-transfer member (s) 770. This configuration may serve to promote rotational alignment between the primary and secondary clutch members 710, 720, respectively.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A drain cleaning apparatus comprising:
a drum housing defining an interior region;
a drain cleaning cable defining a first end and a second end, the drain cleaning cable at least partially disposed in the drum housing;
a torque limiter mounted within the interior region of the drum housing, the torque limiter including a first rotatable member for engagement with a source of rotational power and a second rotatable member for transfer of rotational power to the first end of the drain cleaning cable, wherein the torque limiter further includes at least one spherical member disposed axially between the first and second rotatable members;
a torque limiter housing within which are disposed the first and second rotatable members and said at least one spherical member;
a spring positioned outside of the first and second rotatable members and abutting a shoulder of the torque limiter housing for applying a biasing force between the first and second rotatable members; and
a cable retention plate disposed adjacent the torque limiter and configured to secure the drain cleaning cable against the drum housing.

2. The drain cleaning apparatus of claim 1, wherein the first rotatable member defines a first face directed toward the second rotatable member, wherein the second rotatable member defines a second face directed toward the first rotatable member, wherein the first rotatable member defines at least one capture region along the first face, and wherein said at least one capture region is configured to retain said at least one spherical member therein.

3. The drain cleaning apparatus of claim 2 wherein the second rotatable member defines at least one recessed region along the second face, and wherein said at least one recessed region is configured to contact said at least one spherical member positioned therein.

4. The drain cleaning apparatus of claim 3 wherein the the spring applies a compressive force between the first and second rotatable members, for enabling torque transfer from the first rotatable member to the second rotatable member, wherein, upon application of a predetermined torque to the first rotatable member, said at least one spherical member is displaced from contact with the recessed region of the second rotatable member, thereby limiting transfer of said predetermined torque to the second rotatable member.

5. The drain cleaning apparatus of claim 4 wherein the spring is positioned to urge the second face of the second rotatable member toward the first face of the first rotatable member.

6. The drain cleaning apparatus of claim 2 wherein the torque limiter further includes the torque limiter housing within which are disposed the first and second rotatable members and said at least one spherical member.

7. The drain cleaning apparatus of claim 6 wherein the spring is positioned between the torque limiter housing and the second rotatable member.

8. The drain cleaning apparatus of claim 6 wherein the torque limiter housing and the first rotatable member are threadedly engaged to each other.

9. The drain cleaning apparatus of claim 1 wherein a force produced by the spring can be selectively varied by rotating the torque limiter housing relative to the first rotatable member.

10. The drain cleaning apparatus of claim 2 wherein the torque limiter further includes a cage plate disposed between the first and second rotatable members, wherein the cage plate defines at least one aperture dimensioned to receive said at least one spherical member.

11. The drain cleaning apparatus of claim 5 wherein the torque limiter further includes an adjustment nut threadedly engaged with the second rotatable member, wherein the spring is disposed between the adjusting nut and the second face of the second member.

12. The drain cleaning apparatus of claim 1 wherein the torque limiter is configured to enable adjustment of a maximum torque in a rotational direction.

13. The drain cleaning apparatus of claim 1 wherein the torque limiter housing includes a threaded region, and wherein the first rotatable member includes a corresponding threaded region engageable with the threaded region of the torque limiter housing.

14. A drain cleaning apparatus comprising:
a drum housing defining an interior region;
a drain cleaning cable having a first end and a second end, the cable at least partially disposed within the drum housing;
a torque limiter mounted within the interior region of the drum housing, the torque limiter comprising:
a first rotatable member for engagement with a source of rotational power;
a second rotatable member for transfer of rotational power to the first end of the drain cleaning cable;
at least one spherical member disposed between the first and second rotatable members;
a torque limiter housing within which are disposed the first and second rotatable members and said at least one spherical member;
a spring positioned outside of the first and second rotatable members, the spring abutting a shoulder formed in the torque limiter housing and applying a biasing force to urge the first and second rotatable members together; and
a cable retention plate disposed adjacent the torque limiter, the cable retention plate configured to secure the drain cleaning cable against the drum housing.

15. The drain cleaning apparatus of claim 14, wherein the first rotatable member defines a first face directed toward the second rotatable member, wherein the second rotatable member defines a second face directed toward the first rotatable member, wherein the first rotatable member defines at least one capture region along the first face configured to retain said at least one spherical member therein.

16. The drain cleaning apparatus of claim 15, wherein the second rotatable member defines at least one recessed region along the second face configured to contact said at least one spherical member positioned therein.

17. The drain cleaning apparatus of claim 16, wherein upon application of a predetermined torque to the first rotatable member, said at least one spherical member is displaced from contact with the recessed region of the second rotatable member, thereby limiting transfer of said predetermined torque to the second rotatable member.

18. The drain cleaning apparatus of claim 14, wherein the shoulder is formed as an internal feature of the torque limiter housing.

19. The drain cleaning apparatus of claim 14, wherein the cable retention plate includes a pair of lips spaced apart to receive the drain cleaning cable disposed between the lips.

20. The drain cleaning apparatus of claim 14, wherein the cable retention plate is removably secured to the drum housing.

* * * * *